(12) United States Patent
Wu et al.

(10) Patent No.: US 10,992,500 B2
(45) Date of Patent: Apr. 27, 2021

(54) METHOD AND DEVICE IN UE AND BASE STATION USED FOR WIRELESS COMMUNICATION

(71) Applicant: SHANGHAI LANGBO COMMUNICATION TECHNOLOGY COMPANY LIMITED, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 55 days.

(21) Appl. No.: 16/438,482

(22) Filed: Jun. 12, 2019

(65) Prior Publication Data

US 2019/0386858 A1 Dec. 19, 2019

(30) Foreign Application Priority Data

Jun. 14, 2018 (CN) .......................... 201810613715.2

(51) Int. Cl.
| | | |
|---|---|---|
| *H04L 25/03* | (2006.01) | |
| *H04L 5/00* | (2006.01) | |
| *H04L 1/00* | (2006.01) | |
| *H04L 27/26* | (2006.01) | |
| *H04L 1/18* | (2006.01) | |

(52) U.S. Cl.
CPC ...... *H04L 25/03866* (2013.01); *H04L 1/0063* (2013.01); *H04L 1/1819* (2013.01); *H04L 5/0007* (2013.01); *H04L 5/0048* (2013.01); *H04L 27/2613* (2013.01)

(58) Field of Classification Search
None
See application file for complete search history.

(56) References Cited

U.S. PATENT DOCUMENTS

| | | | | |
|---|---|---|---|---|
| 2019/0319745 A1* | 10/2019 | Pan | ...................... | H04L 5/0053 |
| 2019/0364578 A1* | 11/2019 | Zhang | .................. | H04L 5/0005 |
| 2020/0084009 A1* | 3/2020 | Guan | ................... | H04L 5/0082 |
| 2020/0099471 A1* | 3/2020 | Ye | ..................... | H03M 13/6356 |
| 2020/0127761 A1* | 4/2020 | Wang | .................. | H04L 1/0067 |
| 2020/0228259 A1* | 7/2020 | Hwang | ................ | H04L 5/0007 |

* cited by examiner

*Primary Examiner* — Otis L Thompson, Jr.
(74) *Attorney, Agent, or Firm* — Maschoff Brennan

(57) ABSTRACT

A method and a device in a UE and a base station for wireless communication are provided. A first node performs a first channel coding and transmits a first radio signal. First channel coding is based on a polar code, an input of which comprises a first information bit block and a first check bit block corresponded to an information bit block comprising the first information bit block, and an output of which generates first radio signal and related to a second bit block, values of bits comprised in the second bit block are related to a correlation parameter group comprising at least one of a time-frequency resource occupied by first radio signal, a number of bits comprised in first information bit block, or a first scrambling sequence. First scrambling sequence generates the first check bit block. The method improves precision of error check without increasing CRC length.

16 Claims, 15 Drawing Sheets

Output of first channel coding = [ first coding bit sequence $u$ ] × [ first coding matrix $G_N$ ]

FIG. 7

Correlation parameter group

{time-frequency resource occupied by first radio signal}

FIG. 12

Correlation parameter group

{the number of bits comprised in first information bit block}

FIG. 13

Correlation parameter group

{first scrambling sequence}

FIG. 14

Correlation parameter group

{time-frequency resource occupied by first radio signal,
the number of bits comprised in first information bit block}

FIG. 15

Correlation parameter group

{time-frequency resource occupied by first radio signal,
first scrambling sequence}

FIG. 16

Correlation parameter group

{the number of bits comprised in first information bit block,
first scrambling sequence}

FIG. 17

Correlation parameter group

{time-frequency resource occupied by first radio signal,
the number of bits comprised in first information bit block,
first scrambling sequence}

METHOD AND DEVICE IN UE AND BASE STATION USED FOR WIRELESS COMMUNICATION

CROSS-REFERENCE TO RELATED APPLICATION

This application claims the priority benefit of Chinese Patent Application Serial Number 201810613715.2, filed on Jun. 14, 2018, the full disclosure of which is incorporated herein by reference.

BACKGROUND

Technical Field

The present disclosure relates to methods and devices in wireless communication systems, and in particular to a method and a device in a wireless communication system that supports Cyclic Redundancy Check (CRC).

Related Art

Cyclic Redundancy Check (CRC) is a hash function that generates short and fixed-digit CRC codes based on data such as network packet or computer files. CRC is mainly used for detecting or checking errors possibly occurred after data transmission or data storage, and it performs error detection using the general division and the remainder theorem. In traditional $3^{rd}$ Generation Partner Project (3GPP) Long Term Evolution (LTE) system, CRC has specific functions of error check and target receiver identification.

In 5G systems, in order to meet varied performance requirements posed by diversified application scenarios, Ultra-Reliable and Low Latency Communications (URLLC) becomes one of three major application scenarios in New Radio (NR) system. In URLLC, a typical scenario is presented by smaller quantity of data transmitted each time, and higher demand on transmission defer and transmission reliability.

SUMMARY

The inventors have found through researches that in order to meet the requirement of URLLC for high reliability, the precision of error check on URLLC transmission must be very high. However, the precision of error check provided by a maximum number of CRC bits that the present system can support is not always sufficient for reliability required by URLLC. Since the amount of information transmitted by URLLC each time is smaller, a redundancy further caused by an increasing number of CRC bits will remarkably reduce transmission efficiency. Therefore, how to improve error check precision of URLLC without rising excessive redundancy has been a problem needed to be solved.

In view of the above problem, the present disclosure provides a solution. It should be noted that though originally targeted at URLLC, the present disclosure is also applicable to other business types and application scenarios. The embodiments of a first node in the present disclosure and the characteristics in the embodiments may be applied to a second node if no conflict is incurred, and vice versa. The embodiments of the present disclosure and the characteristics in the embodiments may be mutually combined if no conflict is incurred.

The present disclosure provides a method in a first node used for wireless communication, comprising:
performing a first channel coding; and
transmitting a first radio signal;
wherein the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of the following:
a time-frequency resource occupied by the first radio signal;
a number of bits comprised in the first information bit block; and
a first scrambling sequence, the first scrambling sequence is used for generating the first check bit block.

In one embodiment, the problem to be solved in the present disclosure is: how to improve precision of error check without increasing the number of CRC bits. The above method solves the problem by connecting values of bits in the second bit block to the correlation parameter group.

In one embodiment, the above method is characterized in that all bits in the second bit block are frozen bits of a polar code, values of frozen bits vary according to the correlation parameter group with different parameters. An advantage of the above method is that precision of error check of the first radio signal can be improved without increasing CRC length.

According to one aspect of the present disclosure, comprising:
determining the second bit block based on the correlation parameter group;
wherein the correlation parameter group belongs to one of M1 candidates, at most M detections are performed on the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

According to one aspect of the present disclosure, comprising:
operating first downlink information;
wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the operating is receiving, or, the operating is transmitting.

According to one aspect of the present disclosure, comprising:
operating second downlink information;
wherein the second downlink information is used for determining L2 candidate numbers; the correlation parameter groups comprises a position of the number of bits comprised in the first information bit block in the L2 candidate numbers, the L2 is a positive integer greater than 1, the operating is receiving, or, the operating is transmitting.

According to one aspect of the present disclosure, comprising:

operating third downlink information;

wherein the third downlink information is used for determining L3 candidate scrambling sequences, the correlation parameter group comprises a position of the first scrambling sequence in the L3 candidate scrambling sequences, the L3 is a positive integer greater than 1, the operating is receiving, or, the operating is transmitting.

According to one aspect of the present disclosure, comprising:

operating first information;

wherein the first information is used for determining the M1 candidate bit blocks; the operating is receiving, or, the operating is transmitting.

According to one aspect of the present disclosure, wherein the first node is a User Equipment (UE); or, the first node is a base station.

The present disclosure provides a method in a second node used for wireless communication, comprising:

receiving a first radio signal; and performing a first channel decoding;

wherein a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of the following:

a time-frequency resource occupied by the first radio signal;

the number of bits comprised in the first information bit block; and a first scrambling sequence, the first scrambling sequence is used for generating the first check bit block.

According to one aspect of the present disclosure, comprising:

performing at most M detections on the first radio signal;

wherein the correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

According to one aspect of the present disclosure, comprising:

processing first downlink information;

wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the operating is transmitting, or, the transmitting is receiving.

According to one aspect of the present disclosure, comprising:

processing second downlink information;

wherein the second downlink information is used for determining L2 candidate numbers; the correlation parameter groups comprises a position of the number of bits comprised in the first information bit block in the L2 candidate numbers, the L2 is a positive integer greater than 1; the operating is transmitting, or, the processing is receiving.

According to one aspect of the present disclosure, comprising:

processing third downlink information;

wherein the third downlink information is used for determining L3 candidate scrambling sequences, the correlation parameter group comprises a position of the first scrambling sequence in the L3 candidate scrambling sequences, the L3 is a positive integer greater than 1; the processing is transmitting, or, the processing is receiving.

According to one aspect of the present disclosure, comprising:

processing first information;

wherein the first information is used for determining the M1 candidate bit blocks; the processing is transmitting, or, the processing is receiving.

According to one aspect of the present disclosure, wherein the second node is a base station; or, the second node is a UE.

The present disclosure provides a device in a first node used for wireless communication, comprising:

a first processor, performing a first channel coding; and a second processor, transmitting a first radio signal;

wherein the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of the following:

a time-frequency resource occupied by the first radio signal;

the number of bits comprised in the first information bit block; and a first scrambling sequence, the first scrambling sequence is used for generating the first check bit block.

In one embodiment, the above device in a first node used for wireless communication is characterized in that the first processor further determines the second bit block based on the correlation parameter group; wherein the correlation parameter group belongs to one of M1 candidates, at most M detections are performed on the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

In one embodiment, the above device in a first node used for wireless communication is characterized in that the second processor further operates first downlink information; wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the operating action is receiving, or; the operating action is transmitting.

In one embodiment, the above device in a first node used for wireless communication is characterized in that the second processor further operates second downlink information; wherein the second downlink information is used for determining L2 candidate numbers; the correlation parameter groups comprises a position of the number of bits comprised in the first information bit block in the L2 candidate numbers, the L2 is a positive integer greater than 1; the operating action is receiving, or, the operating action is transmitting.

In one embodiment, the above device in a first node used for wireless communication is characterized in that the second processor further operates third downlink information; wherein the third downlink information is used for determining L3 candidate scrambling sequences, the correlation parameter group comprises a position of the first scrambling sequence in the L3 candidate scrambling sequences, the L3 is a positive integer greater than 1; the operating action is receiving, or, the operating action is transmitting.

In one embodiment, the above device in a first node used for wireless communication is characterized in that the second processor further operates first information; wherein the first information is used for determining the M1 candidates bit blocks; the operating action is receiving, or, the operating action is transmitting.

In one embodiment, the above device in a first node used for wireless communication is characterized in that the first node is a UE.

In one embodiment, the above device in a first node used for wireless communication is characterized in that the first node is a base station.

The present disclosure provides a device in a second node used for wireless communication, comprising:

a third processor, receiving a first radio signal; and a fourth processor, performing a first channel decoding;

wherein a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of the following:

a time-frequency resource occupied by the first radio signal;

the number of bits comprised in the first information bit block; and a first scrambling sequence, the first scrambling sequence is used for generating the first check bit block.

In one embodiment, the above device in a second node used for wireless communication is characterized in that the third processor and the fourth processor perform at most M detections on the first radio signal; wherein the correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

In one embodiment, the above device in a second node used for wireless communication is characterized in that the third processor further processes first downlink information; wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the processing action is transmitting, or, the processing action is receiving.

In one embodiment, the above device in a second node used for wireless communication is characterized in that the third processor further processes second downlink information; wherein the second downlink information is used for determining L2 candidate numbers; the correlation parameter groups comprises a position of the number of bits comprised in the first information bit block in the L2 candidate numbers, the L2 is a positive integer greater than 1; the processing action is transmitting, or, the processing action is receiving.

In one embodiment, the above device in a second node used for wireless communication is characterized in that the third processor further processes third information; wherein the third downlink information is used for determining L3 candidate scrambling sequences, the correlation parameter group comprises a position of the first scrambling sequence in the L3 candidate scrambling sequences, the L3 is a positive integer greater than 1; the processing action is transmitting, or, the processing action is receiving.

In one embodiment, the above device in a second node used for wireless communication is characterized in that the third processor further processes first information; wherein the first information is used for determining the M1 candidate bit blocks; the processing action is transmitting, or, the processing action is receiving.

In one embodiment, the above device in a second node used for wireless communication is characterized in that the second node is a base station.

In one embodiment, the above device in a second node used for wireless communication is characterized in that the second node is a UE.

In one embodiment, the present disclosure has the following advantage over conventional schemes:

Connections are created among values of frozen bits of a polar code, time-frequency resource of a control channel, the payload scale of a control channel and/or a scrambling sequence, thus improving precision of error check without increasing CRC length.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates a schematic diagram of a first channel coding according to one embodiment of the present disclosure;

FIG. 12 illustrates a schematic diagram of a correlation parameter group only comprising a time-frequency resource occupied by a first radio signal according to one embodiment of the present disclosure;

FIG. 13 illustrates a schematic diagram of a correlation parameter group only comprising the number of bits comprised in a first information bit block according to one embodiment of the present disclosure;

FIG. 14 illustrates a schematic diagram of a correlation parameter group only comprising a first scrambling sequence according to one embodiment of the present disclosure;

FIG. 15 illustrates a schematic diagram of a correlation parameter group only comprising a time-frequency resource occupied by a first radio signal and the number of bits comprised in a first information bit block according to one embodiment of the present disclosure;

FIG. 16 illustrates a schematic diagram of a correlation parameter group only comprising a time-frequency resource occupied by a first radio signal and a first scrambling sequence according to one embodiment of the present disclosure;

FIG. 17 illustrates a schematic diagram of a correlation parameter group only comprising the number of bits comprised in a first information bit block and a first scrambling sequence according to one embodiment of the present disclosure;

DESCRIPTION OF THE EMBODIMENTS

Embodiment 1

Figure 1:
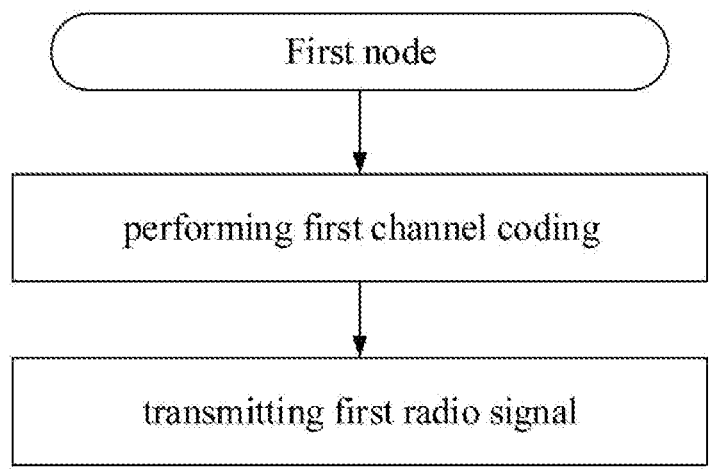
FIG. 1 illustrates a flowchart of a first channel coding and a first radio signal according to one embodiment of the present disclosure.

Embodiment 1 illustrates a flowchart of a first channel coding and a first radio signal; as shown in FIG. 1.

In Embodiment 1, the first node in the present disclosure performs a first channel coding and transmits a first radio signal. Herein the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, all bits comprised in the second bit block have a same value.

In one embodiment, values of bits comprised in the second bit block are only related to the correlation parameter group.

In one embodiment, values of bits comprised in the second bit block are not related to values of bits comprised in the first information bit block.

In one embodiment, the number of bits comprised in the second bit block is not related to any of a time-frequency resource occupied by the first radio signal, the number of bits comprised in the first information bit block, or a first scrambling sequence.

In one embodiment, the first check bit block is a Cyclic Redundancy Check (CRC) bit block of an information bit block corresponding to the first check bit block.

In one embodiment, the first check bit block is a bit block output after a CRC bit block of an information bit block corresponding to the first check bit block is subjected to scrambling of the first scrambling sequence.

In one embodiment, an information bit block corresponding to the first check bit block is the first bit block.

In one embodiment, the first check bit block is a CRC bit block of the first information bit block.

In one embodiment, the first check bit block is a bit block output after a CRC bit block of the first information bit block is subjected to scrambling of the first scrambling sequence.

In one embodiment, the phrase that the first scrambling sequence is used for generating the first check bit block refers to: the first check bit block is a bit block output after a CRC bit block of an information bit block corresponding to the first check bit block is subjected to scrambling of the first scrambling sequence.

In one embodiment, the first check bit block is not related to bits of the second bit block.

In one embodiment, an information bit block corresponding to the first check bit block does not comprise bits of the second bit block.

In one embodiment, the first information bit block comprises a positive integer number of bit(s).

In one embodiment, the first check bit block comprises a positive integer number of bit(s).

In one embodiment, the second bit block comprises a positive integer number of bit(s).

In one embodiment, the number of bits comprised in the first check bit block is 24.

In one embodiment, the number of bits comprised in the first check bit block is 6.

In one embodiment, the number of bits comprised in the first check bit block is 11.

In one embodiment, all bits of the first information bit block are sequentially arranged.

In one embodiment, all bits of the first check bit block are sequentially arranged.

In one embodiment, all bits of the second bit block are sequentially arranged.

In one embodiment, all bits of the first information bit block and all bits of the first check bit block constitute an input of the first channel coding.

In one embodiment, the first channel coding does not comprise rate matching.

In one embodiment, the second bit block consists of frozen bits.

In one embodiment, the correlation parameter group comprises a time-frequency resource occupied by the first radio signal; the time-frequency resource occupied by the first radio signal is a candidate time-frequency resource of L1 candidate time-frequency resources, the L1 is a positive integer greater than 1; for any two candidate time-frequency resources out of the L1 candidate time-frequency resources, the values of bits comprised in the second bit block when the time-frequency resource occupied by the first radio signal is one of the any two candidate time-frequency resources are different from the values of bits comprised in the second bit block when the time-frequency resource occupied by the first radio signal is the other of the any two candidate time-frequency resources.

In one embodiment, the correlation parameter group comprises a time-frequency resource occupied by the first radio signal; the time-frequency resource occupied by the first radio signal is a candidate time-frequency resource of L1 candidate time-frequency resources, the L1 is a positive integer greater than 1; there are at least two candidate time-frequency resources in the L1 candidate time-frequency resources. The values of bits comprised in the second bit block when the time-frequency resource occupied by the first radio signal is one of the two candidate time-frequency resources are different from the values of bits comprised in the second bit block when the time-frequency resource occupied by the first radio signal is another of the two candidate time-frequency resources.

In one embodiment, the correlation parameter group comprises a time-frequency resource occupied by the first radio signal; the time-frequency resource occupied by the first radio signal is a candidate time-frequency resource of L1 candidate time-frequency resources, the L1 is a positive integer greater than 1; there are at least two candidate time-frequency resources in the L1 candidate time-frequency resources. The values of bits comprised in the second bit block when the time-frequency resource occupied by the first radio signal is one of the two candidate time-frequency resources are same as the values of bits comprised in the second bit block when the time-frequency resource occupied by the first radio signal is the other of the two candidate time-frequency resources.

In one embodiment, the correlation parameter group comprises the number of bits comprised in the first information bit block; the number of bits comprised in the first information bit block is a candidate number of L2 candidate numbers, the L2 is a positive integer greater than 1; for any two candidate numbers out of the L2 candidate numbers, the values of bits comprised in the second bit block when the number of bits comprised in the first information bit block is one of the any two candidate numbers are different from the values of bits comprised in the second bit block when the number of bits comprised in the first information bit block is the other of the any two candidate numbers.

In one embodiment, the correlation parameter group comprises the number of bits comprised in the first information bit block; the number of bits comprised in the first information bit block is a candidate number of L2 candidate numbers, the L2 is a positive integer greater than 1; there are at least two candidate numbers in the L2 candidate numbers. The values of bits comprised in the second bit block when the number of bits comprised in the first information bit block is one of the two candidate numbers are different from the values of bits comprised in the second bit block when the number of bits comprised in the first information bit block is the other of the two candidate numbers.

In one embodiment, the correlation parameter group comprises the number of bits comprised in the first information bit block; the number of bits comprised in the first information bit block is a candidate number of L2 candidate numbers, the L2 is a positive integer greater than 1; there are at least two candidate numbers in the L2 candidate numbers. The values of bits comprised in the second bit block when the number of bits comprised in the first information bit block is one of the two candidate numbers are the same as the values of bits comprised in the second bit block when the number of bits comprised in the first information bit block is the other of the two candidate numbers.

In one embodiment, the correlation parameter group comprises the first scrambling sequence; the first scrambling sequence is a candidate scrambling sequence of L3 candidate scrambling sequences, the L3 is a positive integer greater than 1; for any two candidate scrambling sequences out of the L3 candidate scrambling sequences, the values of bits comprised in the second bit block when the first scrambling sequence is one of the any two candidate scrambling sequences are different from the values of bits comprised in the second bit block when the first scrambling sequence is the other of the any two candidate scrambling sequences.

In one embodiment, the correlation parameter group comprises the first scrambling sequence; the first scrambling sequence is a candidate scrambling sequence of L3 candidate scrambling sequences, the L3 is a positive integer greater than 1; there are at least two candidate scrambling sequences in the L3 candidate scrambling sequences. The values of bits comprised in the second bit block when the first scrambling sequence is one of the two candidate scrambling sequences are different from the values of bits comprised in the second bit block when the first scrambling sequence is the other of the two candidate scrambling sequences.

In one embodiment, the correlation parameter group comprises the first scrambling sequence; the first scrambling sequence is a candidate scrambling sequence of L3 candidate scrambling sequences, the L3 is a positive integer greater than 1; there are at least two candidate scrambling sequences in the L3 candidate scrambling sequences. The values of bits comprised in the second bit block when the first scrambling sequence is one of the two candidate scrambling sequences are the same as the values of bits comprised in the second bit block when the first scrambling sequence is the other of the two candidate scrambling sequences.

Embodiment 2

Figure 2:
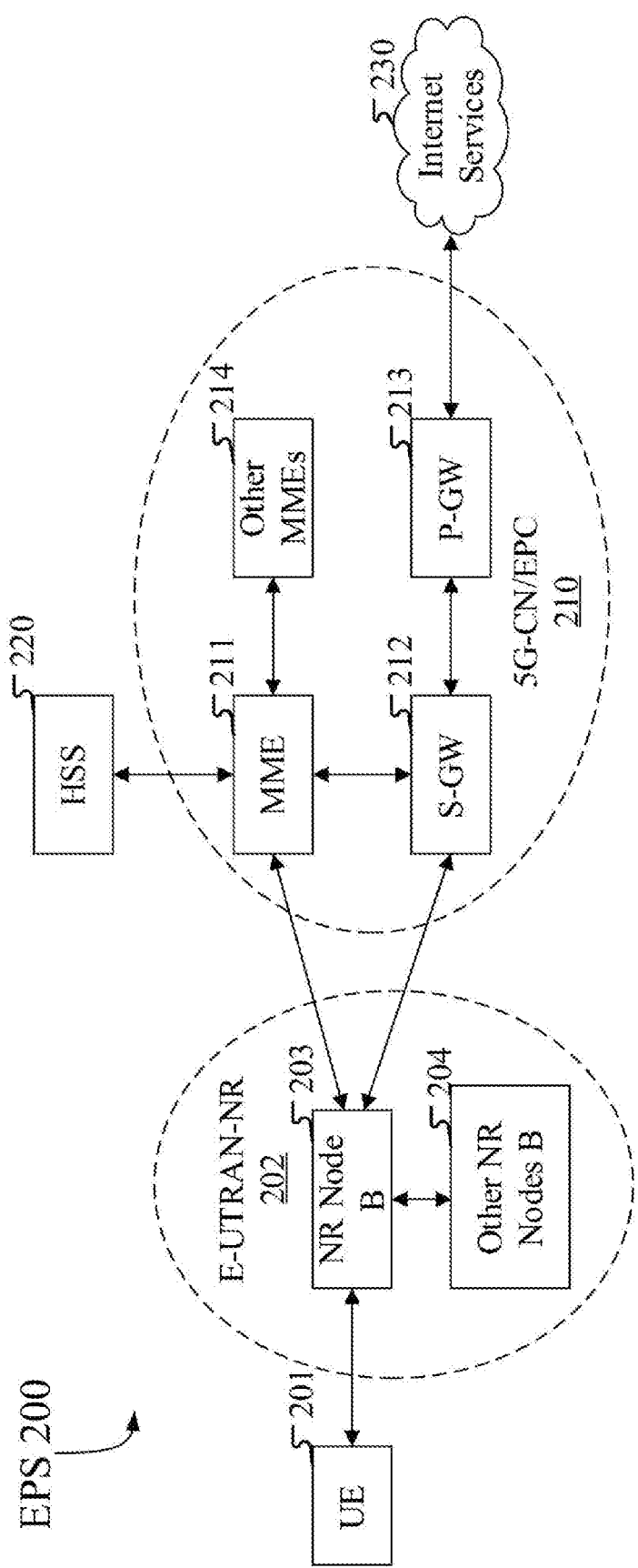
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (EPC/5G-CN) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services.

In one embodiment, the gNB 203 corresponds to a first node in the present disclosure, the UE 201 corresponds to the second node in the present disclosure.

In one embodiment, the gNB 203 corresponds to a second node in the present disclosure, the UE 201 corresponds to the first node in the present disclosure.

In one embodiment, the UE 201 supports CRC.

In one embodiment, the gNB 203 supports CRC.

Embodiment 3

Figure 3:
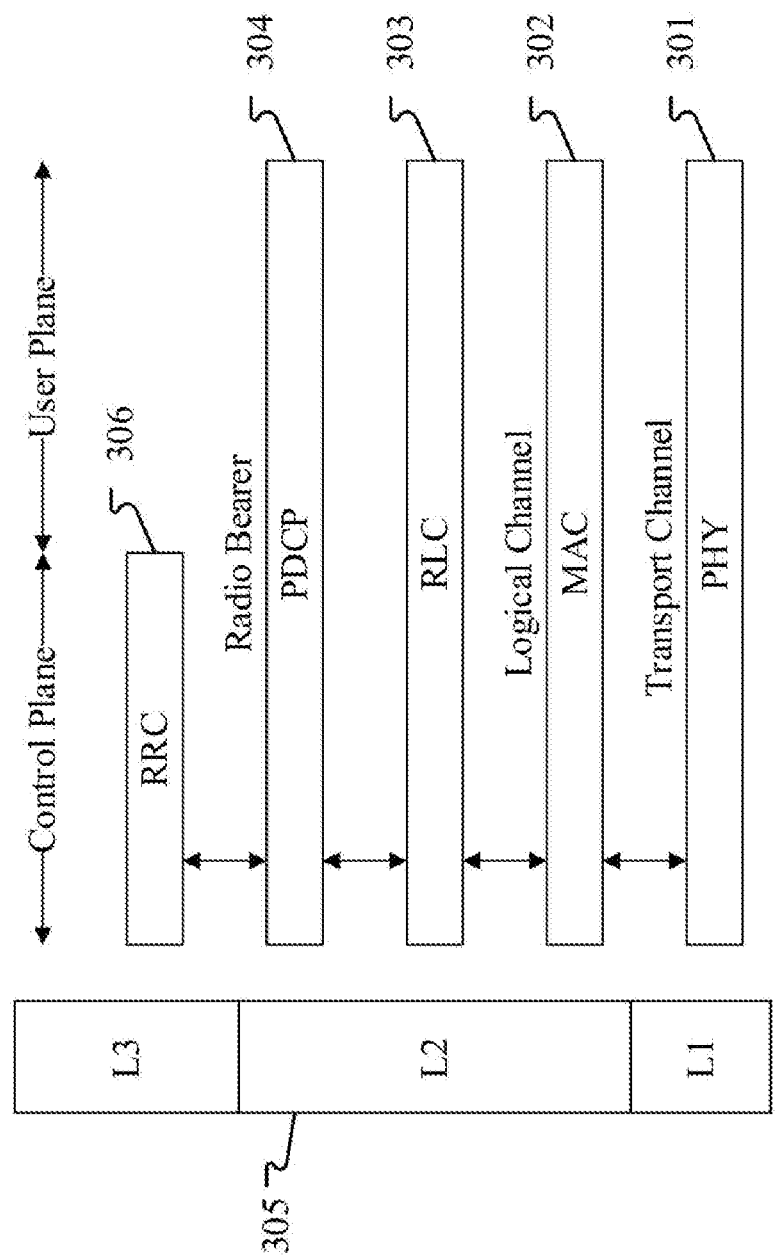
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first radio signal in the present disclosure is generated by the PHY 301.

In one embodiment, the first information bit block in the present disclosure is generated by the MAC sublayer 302.

In one embodiment, the first information bit block in the present disclosure is generated by the PHY 301.

In one embodiment, the first check bit block in the present disclosure is generated by the PHY 301.

In one embodiment, the second bit block in the present disclosure is generated by the PHY 301.

In one embodiment, the first downlink information in the present disclosure is generated by the RRC sublayer 306.

In one embodiment, the first downlink information in the present disclosure is generated by the MAC sublayer 302.

In one embodiment, the second downlink information in the present disclosure is generated by the RRC sublayer 306.

In one embodiment, the second downlink information in the present disclosure is generated by the MAC sublayer 302.

In one embodiment, the third downlink information in the present disclosure is generated by the RRC sublayer 306.

In one embodiment, the third downlink information in the present disclosure is generated by the MAC sublayer 302.

In one embodiment, the first information in the present disclosure is generated by the RRC sublayer 306.

In one embodiment, the first information in the present disclosure is generated by the MAC sublayer 302.

Embodiment 4

Figure 4:
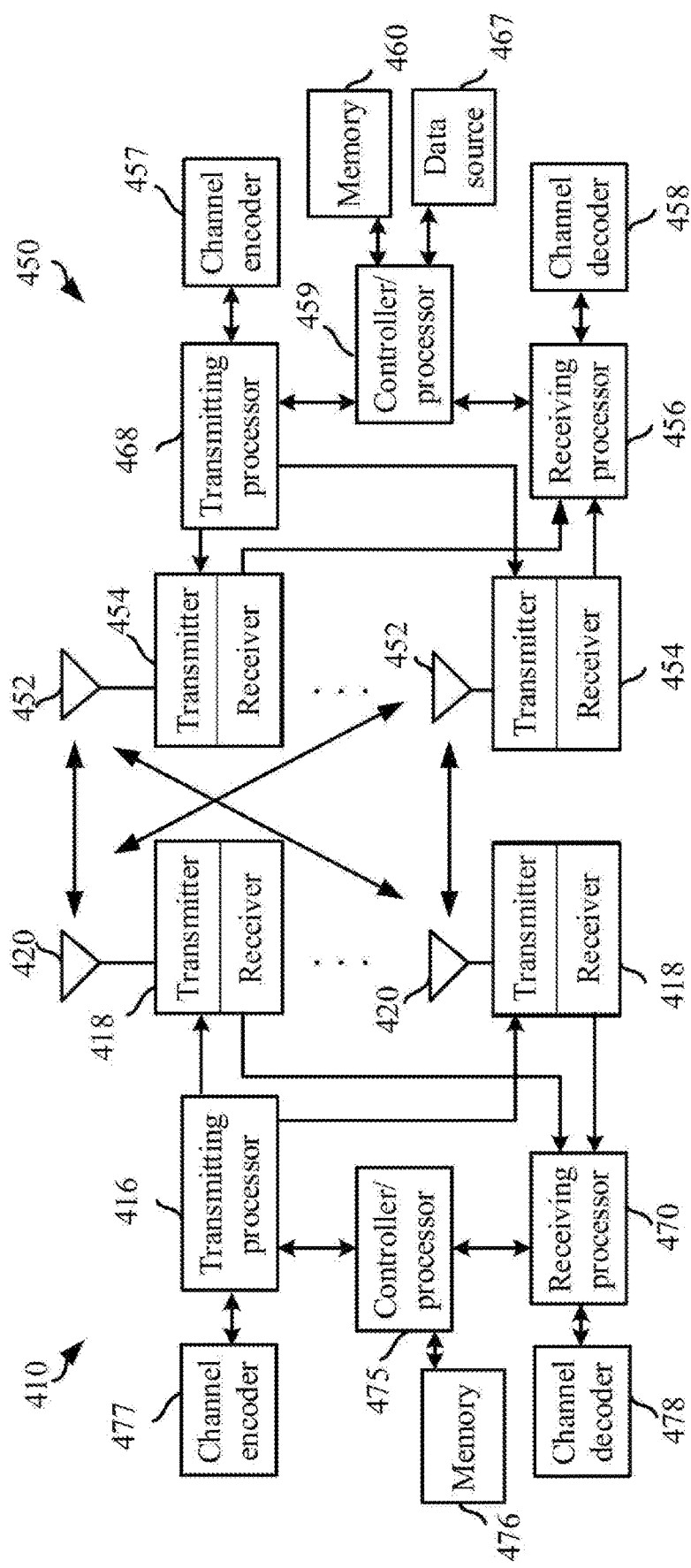
FIG. 4 illustrates a schematic diagram of a New Radio (NR) node and a User Equipment (UE) according to one embodiment of the present disclosure.

Embodiment 4 illustrates a schematic diagram of a New Radio (NR) node and a User Equipment (UE), as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a channel encoder 477, a channel decoder 478, a transmitter/receiver 418 and an antenna 420.

The UE 450 comprises a controller/processor 459, a memory 460, a data source 467, a transmitting processor 468, a receiving processor 456, a channel encoder 457, a channel decoder 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the channel encoder 477 perform signal processing functions used for the L1 layer (that is, PHY). The channel encoder 477 performs coding and interleaving so as to ensure an FEC (Forward Error Correction) at the UE 450 side. The transmitting processor 416 implements the mapping to signal clusters corresponding to each modulation scheme (i.e., BPSK, QPSK, M-PSK, M-QAM, etc.) and performs spatial precoding/beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. Each transmitter 418 converts a baseband multicarrier symbol stream provided by the transmitting processor 416 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the channel decoder 458 perform signal processing functions of the L1 layer. The receiving processor 456 converts the baseband multicarrier symbol stream from time domain into frequency domain using FFT. In frequency domain, a physical layer data signal and a reference signal are de-multiplexed by the receiving processor 456, wherein a reference signal is used for channel estimation, while physical layer data is subjected to multi-antenna detection in the receiving processor 456 to recover any UE 450-targeted spatial stream. Symbols on each spatial stream are demodulated and recovered in the receiving processor 456 to generate a soft decision. Then the channel decoder 458 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The channel encoder 457 performs channel coding. Encoded data is modulated into multicarrier/single-carrier symbol streams through modulation and multi-antenna spatial precoding/beamforming performed by the transmitting processor 468, and then modulated symbol streams are provided from the transmitters 454 to each antenna 452. Each transmitter 454 first converts a baseband symbol stream provided by the transmitting processor 468 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the receiving processor 470. The receiving processor 470 and the channel decoder 478 jointly provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first radio signal in the present disclosure; and performs the first channel decoding in the present disclosure. Herein, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the UE 450 comprises a memory that stores a computer readable instruction program. The computer readable instruction program generates an action when executed by at least one processor. The action includes: receiving the first radio signal in the present disclosure; and performing the first channel decoding in the present disclosure. Herein, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the gNB 410 comprises at least one processor and at least one memory. The at least one memory includes computer program codes. The at least one memory and the computer program codes are configured to be used in collaboration with the at least one processor. The gNB 410 at least performs the first channel coding in the present disclosure; and transmits the first radio signal in the present disclosure. Herein, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the gNB 410 comprises a memory that stores a computer readable instruction program. The computer readable instruction program generates an action when executed by at least one processor. The action includes: performing the first channel coding in the present disclosure; and transmitting the first radio signal in the present disclosure. Herein, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the UE 450 comprises at least one processor and at least one memory. The at least one memory includes computer program codes. The at least one memory and the computer program codes are configured to be used in collaboration with the at least one processor. The UE 450 at least performs the first channel coding in the present disclosure; and transmits the first radio signal in the present disclosure. Herein, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the UE 450 comprises a memory that stores a computer readable instruction program. The computer readable instruction program generates an action when executed by at least one processor. The action includes: performing the first channel coding in the present disclosure; and transmitting the first radio signal in the present disclosure. Herein, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the gNB 410 comprises at least one processor and at least one memory. The at least one memory includes computer program codes. The at least one memory and the computer program codes are configured to be used in collaboration with the at least one processor. The gNB 410 at least receives the first radio signal in the present disclosure; and performs the first channel decoding in the present disclosure. Herein, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the gNB 410 comprises a memory that stores a computer readable instruction program. The computer readable instruction program generates an action when executed by at least one processor. The action includes: receiving the first radio signal in the present disclosure; and performing the first channel decoding in the present disclosure. Herein, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the UE 450 corresponds to the first node in the present disclosure, the gNB 410 corresponds to the second node in the present disclosure.

In one embodiment, the UE 450 corresponds to the second node in the present disclosure, the gNB 410 corresponds to the first node in the present disclosure.

In one embodiment, the channel encoder 477 is used for performing the first channel coding in the present disclosure; the channel decoder 458 is used for performing the first channel decoding in the present disclosure.

In one embodiment, the channel encoder 457 is used for performing the first channel coding in the present disclosure; the channel decoder 478 is used for performing the first channel decoding in the present disclosure.

In one embodiment, at least one of the antenna 420, the transmitter 418, the transmitting processor 416, the channel encoder 477, the controller/processor 475, or the memory 476 is used for transmitting the first radio signal in the present disclosure; at least one of the antenna 452, the receiver 454, the receiving processor 456, the channel decoder 458, the controller/processor 459, the memory 460, or the data source 467 is used for receiving the first radio signal in the present disclosure.

In one embodiment, at least one of the antenna 452, the transmitter 454, the transmitting processor 468, the channel encoder 457, the controller/processor 459, the memory 460, or the data source 467 is used for transmitting the first radio signal in the present disclosure; at least one of the antenna 420, the receiver 418, the receiving processor 470, the channel decoder 478, the controller/processor 475, or the data source 476 is used for receiving the first radio signal in the present disclosure.

In one embodiment, the channel encoder 477 is used for determining the second bit block in the present disclosure based on the correlation parameter group in the present disclosure.

In one embodiment, the channel encoder 457 is used for determining the second bit block in the present disclosure based on the correlation parameter group in the present disclosure.

In one embodiment, at least one of the antenna 452, the receiver 454, the receiving processor 456, the channel decoder 458, or the controller/processor 459 is used for performing at most M detections on the first radio signals in the present disclosure.

In one embodiment, at least one of the antenna 420, the receiver 418, the receiving processor 470, the channel decoder 478, or the controller/processor 475 is used for performing at most M detections on the first radio signals in the present disclosure.

In one embodiment, at least one of the antenna 420, the transmitter 418, the transmitting processor 416, the channel encoder 477, the controller/processor 475, or the memory 476 is used for transmitting the first downlink information in the present disclosure; at least one of the antenna 452, the receiver 454, the receiving processor 456, the channel decoder 458, the controller/processor 459, the memory 460, or the data source 467 is used for receiving the first downlink information in the present disclosure.

In one embodiment, at least one of the antenna 420, the transmitter 418, the transmitting processor 416, the channel encoder 477, the controller/processor 475, or the memory 476 is used for transmitting the second downlink information in the present disclosure; at least one of the antenna 452, the receiver 454, the receiving processor 456, the channel decoder 458, the controller/processor 459, the memory 460, or the data source 467 is used for receiving the second downlink information in the present disclosure.

In one embodiment, at least one of the antenna 420, the transmitter 418, the transmitting processor 416, the channel encoder 477, the controller/processor 475, or the memory 476 is used for transmitting the third downlink information in the present disclosure; at least one of the antenna 452, the receiver 454, the receiving processor 456, the channel decoder 458, the controller/processor 459, the memory 460, or the data source 467 is used for receiving the third downlink information in the present disclosure.

In one embodiment, at least one of the antenna 420, the transmitter 418, the transmitting processor 416, the channel encoder 477, the controller/processor 475, or the memory 476 is used for transmitting the first information in the present disclosure; at least one of the antenna 452, the receiver 454, the receiving processor 456, the channel decoder 458, the controller/processor 459, the memory 460, or the data source 467 is used for receiving the first information in the present disclosure.

Embodiment 5

Figure 5:
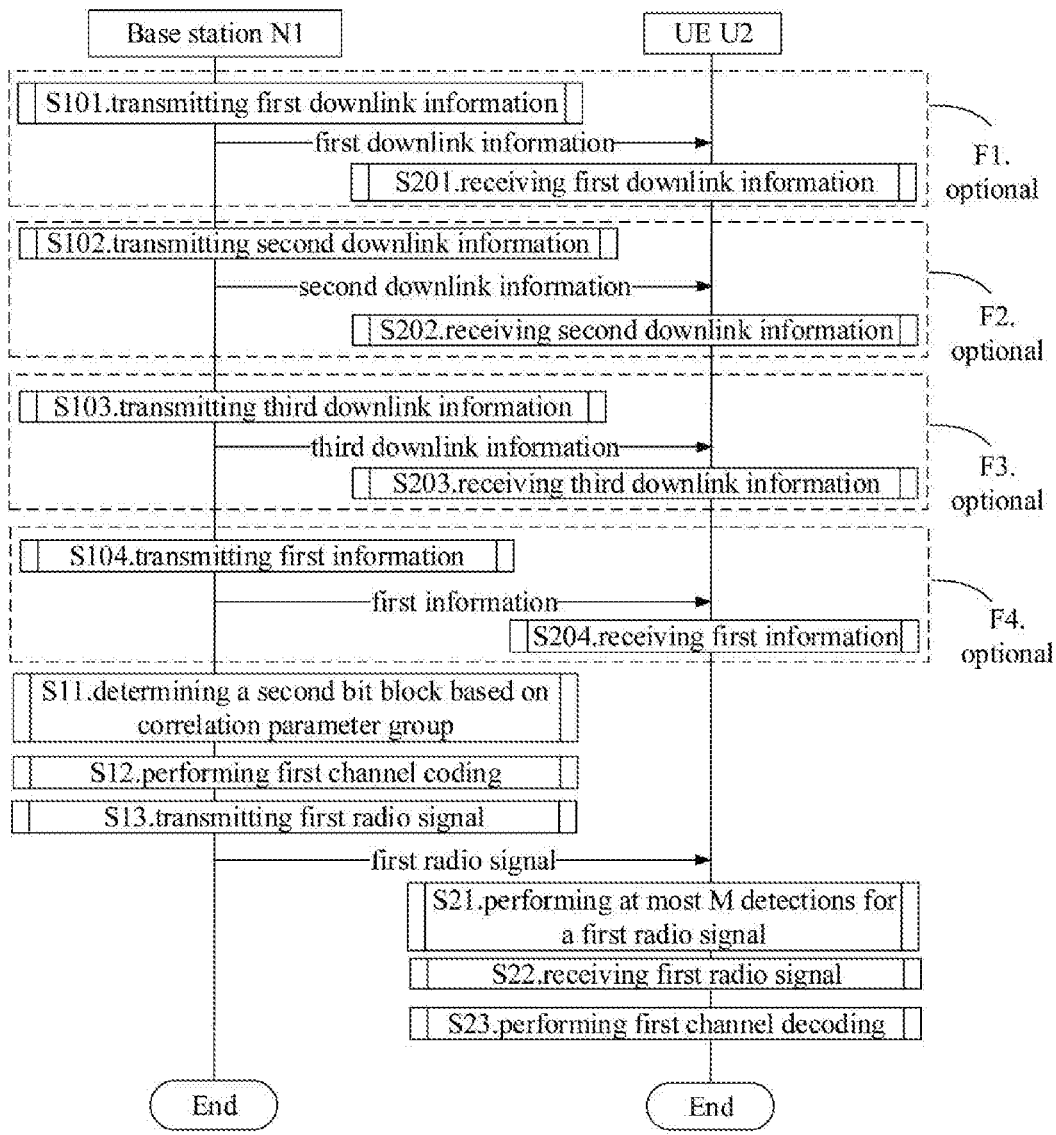
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is the first node in the present disclosure, a UE U2 is the second node in the present disclosure. The base station N1 is a maintenance base station for a serving cell of the UE U2. In FIG. 5, steps in boxes F1 to F4 are optional, respectively.

The base station N1 transmits first downlink information in step S101; transmits second downlink information in step S102; transmits third downlink information in step S103; transmits first information in step S104; determines a second bit block based on a correlation parameter group in step S11; performs a first channel coding in step S12; and transmits a first radio signal in step S13.

The UE U2 receives first downlink information in step S201; receives second downlink information in step S202; receives third downlink information in step S203; receives first information in step S204; performs at most M detections on a first radio signal in step S21; receives the first radio signal in step S22; and performs a first channel decoding in step S23.

In Embodiment 5, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used by the base station N1 for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used by the base station N1 for generating the first check bit block. The correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1. The first information is used by the UE U2 for determining the M1 candidate bit blocks.

In one embodiment, a time-frequency resource occupied by the first radio signal is a COntrol REsource SET (CORESET).

In one embodiment, a time-frequency resource occupied by the first radio signal is a search space.

In one embodiment, a time-frequency resource occupied by the first radio signal is a Physical Downlink Control CHannel (PDCCH) candidate. The specific meaning of PDCCH candidate can be found in 3GPP TS36.213, Chapter 9.1.

In one embodiment, a time-frequency resource occupied by the first radio signal is an Enhanced PDCCH (EPDCCH) candidate. The specific meaning of EPDCCH candidate can be found in 3GPP TS36.213, Chapter 9.1.

In one embodiment, a time-frequency resource occupied by the first radio signal is a short PDCCH (sPDCCH) candidate.

In one embodiment, a time-frequency resource occupied by the first radio signal is a New Radio PDCCH (NR-PDCCH) candidate.

In one embodiment, a time-frequency resource occupied by the first radio signal is a Narrow Band PDCCH (NB-PDCCH) candidate.

In one embodiment, in the first channel decoding, the second node in the present disclosure assumes that values of bits comprised in the second bit block are already known.

In one embodiment, before successfully receiving the first radio signal, the second node in the present disclosure cannot determine values of bits comprised in the second bit block.

In one embodiment, the second bit block is a candidate bit block of the M1 candidate bit blocks that corresponds to a target candidate, the target candidate is a candidate of the M1 candidates, the correlation parameter group belongs to the target candidate.

In one embodiment, the phrase that detections of the M1 detection groups employ M1 candidate bit blocks respectively refers to: for any given detection in any given detection group of the M1 detection groups, a target receiver of the first radio signal assumes that the second bit block is a candidate bit block of the M1 candidate bit blocks that corresponds to the any given detection group.

In one embodiment, the first downlink information is used by the UE U2 for determining L1 indices; the correlation parameter group comprises a position of an index of a time-frequency resource occupied by the first radio signal in the L1 indices, the L1 indices correspond to L1 time-frequency resources respectively, the L1 is a positive integer greater than 1.

In one embodiment, an index of a time-frequency resource occupied by the first radio signal is an index of the L1 indices.

In one embodiment, a time-frequency resource occupied by the first radio signal is a candidate time-frequency resource of the L1 candidate time-frequency resources.

In one embodiment, the correlation parameter group comprises a position of an index of a time-frequency resource occupied by the first radio signal in the L1 indices; for any two indices of the L1 indices, when an index of a time-frequency resource occupied by the first radio signal is either of the any two indices, values of bits comprised in the second bit block will vary accordingly.

In one embodiment, the correlation parameter group comprises a position of an index of a time-frequency resource occupied by the first radio signal in the L1 indices; there are at least two indices in the L1 indices, when an index of a time-frequency resource occupied by the first radio signal is either of the two indices, values of bits comprised in the second bit block will vary accordingly.

In one embodiment, the correlation parameter group comprises a position of an index of a time-frequency resource occupied by the first radio signal in the L1 indices; there are at least two indices in the L1 indices, when an index of a time-frequency resource occupied by the first radio signal is either of the two indices, values of bits comprised in the second bit block will stay the same.

In one embodiment, the index for a time-frequency resource occupied by the first radio signal is an index of a CORESET where a time-frequency resource occupied by the first radio signal is located.

In one embodiment, the index for a time-frequency resource occupied by the first radio signal is an index of a search space where a time-frequency resource occupied by the first radio signal is located.

In one embodiment, the index for a time-frequency resource occupied by the first radio signal is an index of a PDCCH candidate occupied by the first radio signal.

In one embodiment, the index for a time-frequency resource occupied by the first radio signal is an index of an EPDCCH candidate occupied by the first radio signal.

In one embodiment, the index for a time-frequency resource occupied by the first radio signal is an index of a sPDCCH candidate occupied by the first radio signal.

In one embodiment, the index for a time-frequency resource occupied by the first radio signal is an index of an NR-PDCCH candidate occupied by the first radio signal.

In one embodiment, the index for a time-frequency resource occupied by the first radio signal is an index of an NB-PDCCH candidate occupied by the first radio signal.

In one embodiment, the L1 indices are indices for L1 CORESETs, respectively.

In one embodiment, the L1 candidate time-frequency resources are L1 CORESETs, respectively.

In one embodiment, the L1 indices are indices for L1 search spaces, respectively.

In one embodiment, the L1 candidate time-frequency resources are L1 search spaces, respectively.

In one embodiment, the L1 indices are indices for L1 PDCCH candidates, respectively.

In one embodiment, the L1 candidate time-frequency resources are L1 PDCCH candidates, respectively.

In one embodiment, the L1 indices are indices for L1 EPDCCH candidates, respectively.

In one embodiment, the L1 candidate time-frequency resources are L1 EPDCCH candidates, respectively.

In one embodiment, the L1 indices are indices for L1 sPDCCH candidates, respectively.

In one embodiment, the L1 candidate time-frequency resources are L1 sPDCCH candidates, respectively.

In one embodiment, the L1 indices are indices for L1 NR-PDCCH candidates, respectively.

In one embodiment, the L1 candidate time-frequency resources are L1 NR-PDCCH candidates, respectively.

In one embodiment, the L1 indices are indices for L1 NB-PDCCH candidates, respectively.

In one embodiment, the L1 candidate time-frequency resources are L1 NB-PDCCH candidates, respectively.

In one embodiment, the L1 is a positive integer not greater than 44.

In one embodiment, the L1 indices are sorted by size sequentially.

In one embodiment, the L1 indices are L1 non-consecutive positive integers.

In one embodiment, there exist two adjacent indices in the L1 indices such that a difference between the two adjacent indices has an absolute value greater than 1.

In one embodiment, the first downlink information indicates the L1 indices.

In one embodiment, the first downlink information is carried by a higher-layer signaling.

In one embodiment, the first downlink information is carried by a Radio Resource Control (RRC) signaling.

In one embodiment, the first downlink information is carried by a Medium Access Control layer Control Element (MAC CE) signaling.

In one embodiment, the second downlink information is used by the UE U2 for determining L2 candidate numbers; the correlation parameter group comprises a position of the number of bits comprised in the first information bit block in the L2 candidate numbers, the L2 is a positive integer greater than 1.

In one embodiment, the L2 is equal to 2.

In one embodiment, the L2 is a positive integer not greater than 44.

In one embodiment, the L2 candidate numbers are sorted by size sequentially.

In one embodiment, the L2 candidate numbers are L2 non-consecutive positive integers.

In one embodiment, the second downlink information indicates the L2 candidate numbers.

In one embodiment, the second downlink information is carried by a higher-layer signaling.

In one embodiment, the second downlink information is carried by an RRC signaling.

In one embodiment, the second downlink information is carried by a MAC CE signaling.

In one embodiment, the third downlink information is used by the UE U2 for determining L3 candidate scrambling sequence, the correlation parameter group comprises a position of the first scrambling sequence in the L3 candidate scrambling sequences, the L3 is a positive integer greater than 1.

In one embodiment, the L3 is equal to 2.

In one embodiment, the L3 is a positive integer not greater than 44.

In one embodiment, the L3 candidate scrambling sequences are sorted by size sequentially.

In one embodiment, any one given candidate scrambling sequence of the L3 candidate scrambling sequences is a binary sequence, the size of the any one given candidate scrambling sequence is a value corresponding to the binary sequence.

In one embodiment, the L3 scrambling sequences are non-consecutive in size.

In one embodiment, the L3 scrambling sequences are of the same length.

In one embodiment, the third downlink information indicates the L3 scrambling sequences.

In one embodiment, the third downlink information is carried by a higher-layer signaling.

In one embodiment, the third downlink information is carried by an RRC signaling.

In one embodiment, the third downlink information is carried by a MAC CE signaling.

In one embodiment, the first information indicates the M1 candidate bit blocks.

In one embodiment, the first information is used for determining the M1 candidates.

In one embodiment, the first information indicates the M1 candidates.

In one embodiment, the first information is carried by a higher-layer signaling.

In one embodiment, the first information is carried by an RRC signaling.

In one embodiment, the first information is carried by a MAC CE signaling.

In one embodiment, the order of transmission for any two of the first downlink information, the second downlink information, the third downlink information and the first information is not fixed.

In one embodiment, the first node in the present disclosure is a base station, the second node in the present disclosure is a UE, the first radio signal comprises a Downlink Control Information (DCI).

In one embodiment, the first node in the present disclosure is a base station, the second node in the present disclosure is a UE, the first radio signal comprises a cell-common DCI.

In one embodiment, the first node in the present disclosure is a base station, the second node in the present disclosure is a UE, the first radio signal comprises a UE-specific DCI.

In one embodiment, the first node in the present disclosure is a base station, the second node in the present disclosure is a UE, the first radio signal comprises a terminal group-common DCI; the terminal group comprises a positive integer number of terminal(s), the second node is a terminal of the terminal group.

In one embodiment, the first node in the present disclosure is a base station, the second node in the present disclosure is a UE, the first node transmits the first downlink information, the second node receives the first downlink information.

In one embodiment, the first node in the present disclosure is a base station, the second node in the present disclosure is a UE, the first node transmits the second downlink information, the second node receives the second downlink information.

In one embodiment, the first node in the present disclosure is a base station, the second node in the present disclosure is a UE, the first node transmits the third downlink information, the second node receives the third downlink information.

In one embodiment, the first node in the present disclosure is a base station, the second node in the present disclosure is a UE, the first node transmits the first information. The second node receives the first information.

In one embodiment, the first radio signal is transmitted on a downlink physical layer control channel (i.e., a downlink channel that can only be used for bearing physical layer signaling), the first node is a base station, the second node is a UE.

In one subembodiment of the above embodiment, the downlink physical layer control channel is a PDCCH.

In one subembodiment of the above embodiment, the downlink physical layer control channel is an EPDCCH.

In one subembodiment of the above embodiment, the downlink physical layer control channel is a sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the first downlink information is transmitted on a downlink physical layer data channel (i.e., a downlink channel that can be used for bearing physical layer data).

In one embodiment, the second downlink information is transmitted on a downlink physical layer data channel (i.e., a downlink channel that can be used for bearing physical layer data).

In one embodiment, the third downlink information is transmitted on a downlink physical layer data channel (i.e., a downlink channel that can be used for bearing physical layer data).

In one embodiment, the first information is transmitted on a downlink physical layer data channel (i.e., a downlink channel that can be used for bearing physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

Embodiment 6

Figure 6:
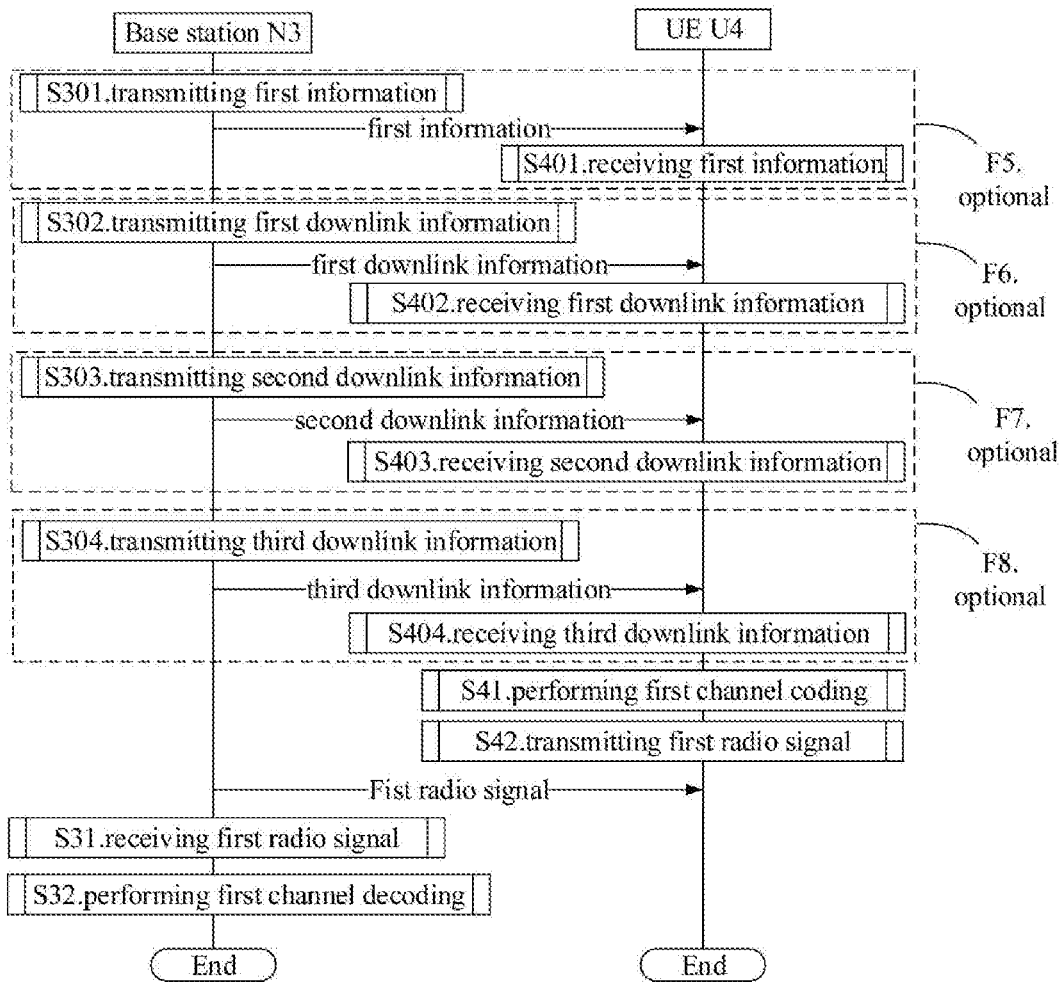
FIG. 6 illustrates a flowchart of wireless transmission according to one embodiment of the present disclosure.

Embodiment 6 illustrates a flowchart of wireless transmission, as shown in FIG. 6. In FIG. 6, a base station N3 is the second node in the present disclosure, a UE U4 is the first node in the present disclosure. The base station N3 is a maintenance base station for a serving cell of the UE U4. In FIG. 6, steps in boxes F5 to F8 are optional, respectively.

The base station N3 transmits first information in step S301; transmits first downlink information in step S302; transmits second downlink information in step S303; transmits third information in step S304; receives a first radio signal in step S31; and performs a first channel decoding in step S32.

The UE U4 receives first information in step S401; receives first downlink information in step S402; receives second downlink information in step S403; receives third downlink information in step S404; performs a first channel coding in step S41; and transmits a first radio signal in step S42.

In Embodiment 6, a channel coding corresponding to the first channel decoding is the first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used by the UE U4 for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used by the UE U4 for generating the first check bit block.

In one embodiment, the first node in the present disclosure is a UE, the second node in the present disclosure is a base station, the first radio signal comprises Uplink control information (UCI).

In one embodiment, the first node in the present disclosure is a UE, the second node in the present disclosure is a base station, the first radio signal comprises one or more of a Hybrid Automatic Repeat request-Acknowledgement (HARQ-ACK), a Scheduling Request (SR), Channel State Information (CSI), a Channel-state information reference signals Resource Indicator (CRI), a Rank Indicator (RI), a Precoding Matrix Indicator (PMI), a Reference Signal Received Power (RSRP), Reference Signal Received Quality (RSRQ), and a Channel Quality Indicator (CQI).

In one embodiment, the first node in the present disclosure is a UE, the second node in the present disclosure is a base station, the first node receives the first downlink information, the second node transmits the first downlink information.

In one embodiment, the first node in the present disclosure is a UE, the second node in the present disclosure is a base station, the first node receives the second downlink information, the second node transmits the second downlink information.

In one embodiment, the first node in the present disclosure is a UE, the second node in the present disclosure is a base station, the first node receives the third downlink information, the second node transmits the third downlink information.

In one embodiment, the first node in the present disclosure is a UE, the second node in the present disclosure is a base station, the first node receives the first information, the second node transmits the first information.

In one embodiment, the first radio signal is transmitted on an uplink physical layer control channel (i.e., an uplink channel that can only be used for bearing physical layer signaling), the first node is a UE, the second node is a base station.

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

Embodiment 7

Embodiment 7 illustrates a schematic diagram of a first channel coding; as shown in FIG. 7.

In Embodiment 7, the first channel coding is based on a polar code. An output of the first channel coding is a product of a first coding bit sequence and a first coding matrix. The first coding bit sequence consists of all bits of the first information bit block in the present disclosure, all bits of the first check bit block in the present disclosure and all bits of the second bit block in the present disclosure. The first coding matrix is $G_N$, the $G_N$ is a matrix with N rows and N columns, the N is the length of the first coding bit sequence, the specific meaning of the $G_N$ can be found in 3GPP TS38.212, Chapter 5.3.1.

In one embodiment, a specific method of implementing polar code can be found in 3GPP TS38.212, Chapter 5.3.1.

In one embodiment, the first channel coding comprises interleaving and polar encoding, a specific method of implementing the interleaving and polar encoding can be found in 3GPP TS38.212, Chapter 5.3.1.1 and Chapter 5.3.1.2, respectively.

In one embodiment, the first channel coding does not comprise rate matching.

In one embodiment, an index of any bit of the second bit block in the first coding bit sequence belongs to $\overline{Q}_F^N$ the $\overline{Q}_F^N$ is a subset of a collection of 0, . . . and N−1; the specific meaning of the $\overline{Q}_F^N$ can be found in 3GPP TS38.212, Chapter 5.3.1.

In one embodiment, an index of any bit of the second bit block in the first coding bit sequence does not belong to $\overline{Q}_I^N$, the $\overline{Q}_I^N$ is a subset of a collection of 0, . . . and N−1; the specific meaning of the $\overline{Q}_I^N$ can be found in 3GPP TS38.212, Chapter 5.3.1.

In one embodiment, the N is a number of bits comprised in an output of the first channel coding.

In one embodiment, all bits of the first coding bit sequence are sequentially arranged.

In one embodiment, the first coding bit sequence is u, the specific meaning of the u can be found in 3GPP TS38.212 (V15.1.1), Chapter 5.3.1.2.

In one embodiment, values of all bits comprised in the second bit block are equal.

In one embodiment, a coding rate for the first channel coding is equal to a quotient of a first integer divided by a second integer, the first integer is equal to a sum of the number of bits in the first information bit block and the number of bits in the first check bit block, the second integer is equal to the number of bits comprised in an output of the first channel coding.

In one embodiment, when rate matching is not taken into account, a coding rate for the first channel coding is equal to a quotient of a first integer divided by a second integer, the first integer is equal to a sum of the number of bits in the first information bit block and the number of bits in the first check bit block, the second integer is equal to the number of bits comprised in an output of the first channel coding.

In one embodiment, the number of bits comprised in an output of the first channel coding is equal to a sum of the number of bits in the first information bit block, the number of bits in the first check bit block and the number of bits in the second bit block.

Embodiment 8

Figure 8:
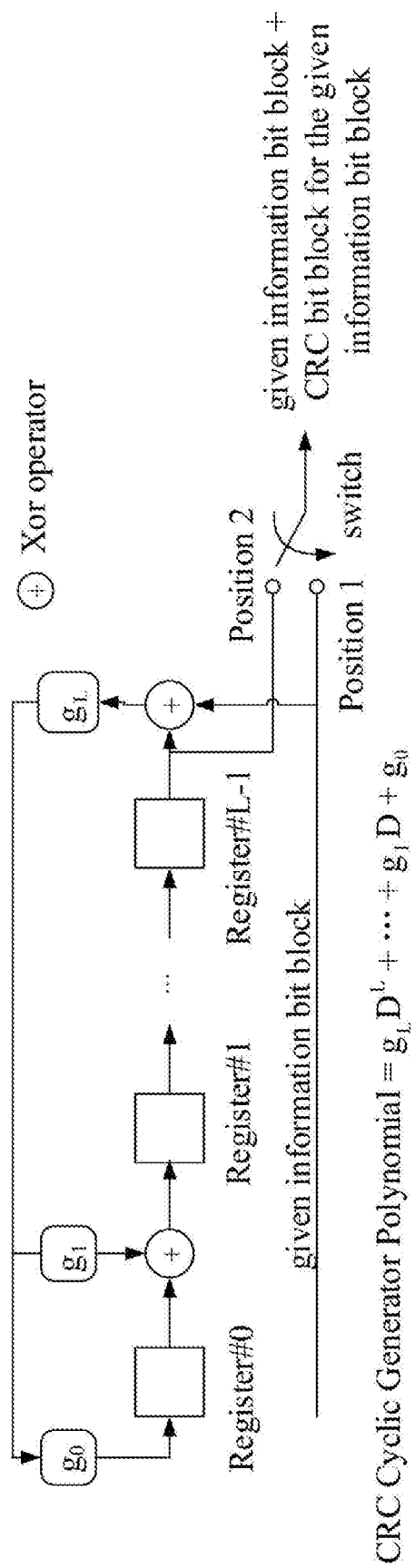
FIG. 8 illustrates a block diagram of a circuit used for generating CRC bit blocks according to one embodiment of the present disclosure.

Embodiment 8 illustrates a block diagram of a circuit used for generating CRC bit blocks; as shown in FIG. 8.

In Embodiment 8, a CRC bit block of a given information bit block is an output after the given information bit block is subjected to a CRC Cyclic Generator Polynomial. The given information bit block is an information bit block corresponding to the first check bit block in the present disclosure, or is the first information bit block in the present disclosure. A block diagram of a circuit for check bit block is shown in FIG. 8.

In FIG. 8, the CRC Cyclic Generator Polynomial is described as: $g_L D^L + \ldots + g_1 D + g_0$, wherein $g_L, \ldots, g_1$, and $g_0$ are coefficients of the CRC Cyclic Generator Polynomial, the L is the number of bits in the CRC bit block of the given information bit block, a value of any coefficient out of coefficients of the CRC Cyclic Generator Polynomial is equal to 0 or 1. A circuit in FIG. 8 comprises a shift-register sequence consisting of L shift registers, a switch, L+1 taps, and L exclusive or (Xor) operators. The L+1 taps are located at both sides of the L shift registers respectively, as shown in FIG. 8. Indices for the L shift registers are #0, #1 . . . , and #L−1, respectively. The L+1 taps respectively correspond to L+1 coefficients of the CRC Cyclic Generator Polynomial, which are $g_L, \ldots g_1$, and $g_0$.

Home position of a switch in FIG. 8 is located at position 1 in FIG. 8, bits in the given information bit block are sequentially input to a shift register sequence consisting of L shift registers, and are sequentially output at the same time. After all bits in the given information bit block have been input to the shift register sequence consisting of L shift registers, the switch is shifted to position 2 in FIG. 8, and then begins to output values in the L shift registers in sequence, starting from shift register #L−1. Values in the L shift registers that are output constitute the CRC bit block of the given information bit block.

In one embodiment, the specific meaning and technical details of and generation method for the CRC bit blocks can be found in 3GPP TS 36.212, chapter 5, and 3GPP TS 38.212, chapter 5.

In one embodiment, an initial value for each of the L shift registers is 0.

In one embodiment, an initial value for each of the L shift registers is 1.

In one embodiment, initial values for the L shift registers are pre-configured.

In one embodiment, before bits in the given information bit block are input to a shift register sequence consisting of the L shift registers, bits in a fixed bit block have been input to the shift register sequence consisting of the L shift registers, values of all bits in the fixed bit block are a constant, which is 1.

In one embodiment, all bits in a fixed bit block and all bits in the given information bit block are sequentially input to a shift register sequence corresponding to the CRC Cyclic Generator Polynomial, wherein bits in the fixed bit block are input to the shift register sequence corresponding to the CRC Cyclic Generator Polynomial prior to bits in the given information bit block. Values of all bits in the fixed bit block are a constant, which is 1.

In one embodiment, a polynomial consisting of the given information bit block and the CRC bit block of the given information bit block can be divided by the CRC Cyclic Generator Polynomial on GF(2), namely, a polynomial consisting of the given information bit block and the CRC bit block of the given information bit block yields a remainder equal to 0 when divided by the CRC Cyclic Generator Polynomial.

In one embodiment, a polynomial consisting of a fixed bit block, the given information bit block and the CRC bit block of the given information bit block can be divided by the CRC Cyclic Generator Polynomial on GF(2), namely, a polynomial consisting of the fixed bit block, the given information bit block and the CRC bit block of the given information bit block yields a remainder equal to 0 when divided by the CRC Cyclic Generator Polynomial. Values of all bits in the fixed bit block are a constant, which is 1.

In one embodiment, the number of bits comprised in the fixed bit block is equal to the number of bits comprised in the first check bit block.

In one embodiment, the number of bits comprised in the fixed bit block is equal to 24.

In one embodiment, a polynomial consisting of the given information bit block and a CRC bit block of the given information bit block is: $a_0 D^{L+A-1} + a_1 D^{L+A-2} + \ldots + a_{A-1} D^{L-1} + p_1 D^{L-2} \ldots p_{L-2} D + p_{L-1}$, wherein the A is the number of bits comprised in the given information bit block; the $a_0$, the $a_1, \ldots$ and the $a_{A-1}$ are A bits comprised in the given information bit block; the $p_0$, the $p_1, \ldots$ and the $p_{L-1}$ are L bits comprised in a CRC bit block of the given information bit block.

In one embodiment, a polynomial consisting of a fixed bit block, the given information bit block and a CRC bit block of the given information bit block is: $a'_0 D^{2L+A-1} + a'_1 D^{2L+A-2} + \ldots + a'_{A+L-1} D^L + p_0 D^{L-1} + p_1 D^{L-2} + \ldots p_{L-2} D + p_{L-1}$, wherein the A is the number of bits comprised in the given information bit block; for any non-negative integer i less than the L, $a'_i = 1$; for any positive integer i not less than L and less than A+L, $a'_i = a_{i-L}$; the $a_0$, the $a_1, \ldots$ and the $a_{A-1}$ are A bits comprised in the given information bit block; the $p_0$, the and the $p_{L-1}$ are L bits comprised in a CRC bit block of the given information bit block.

In one embodiment, the CRC Cyclic Generator Polynomial is $D^{24} + D^{23} + D^6 + D^5 + D + 1$.

In one embodiment, the CRC Cyclic Generator Polynomial is $D^{24} + D^{23} + D^6 + D^5 + D + 1$.

In one embodiment, the CRC Cyclic Generator Polynomial is $D^{24} + D^{23} + D^{21} + D^{20} + D^{17} + D^{15} + D^{13} + D^{12} + D^8 + D^4 + D^2 + D + 1$.

In one embodiment, the CRC Cyclic Generator Polynomial is $D^{16} + D^{12} + D^5 + 1$.

In one embodiment, the CRC Cyclic Generator Polynomial is $D^8 + D^7 + D^4 + D^3 + D + 1$.

In one embodiment, the CRC Cyclic Generator Polynomial is $D^{11} + D^{10} + D^9 + D^5 + 1$.

In one embodiment, the CRC Cyclic Generator Polynomial is $D^6 + D^5 + 1$.

Embodiment 9

Figure 9:
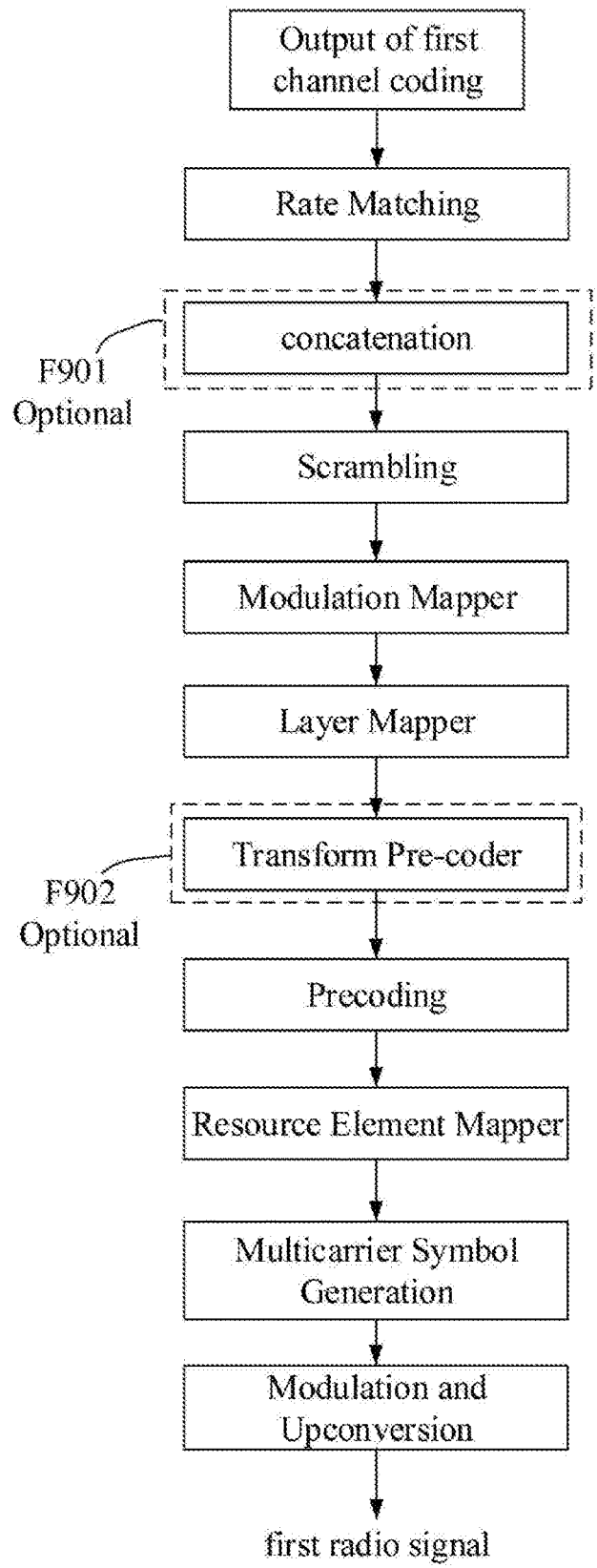
FIG. 9 illustrates a schematic diagram of an output of a first channel coding being used for generating a first radio signal according to one embodiment of the present disclosure.

Embodiment 9 illustrates a schematic diagram of an output of a first channel coding being used for generating a first radio signal; as shown in FIG. 9.

In Embodiment 9, the first radio signal is an output after an output of the first channel coding is sequentially subjected to part of or all processes of rate matching, concatenation, scrambling, a modulation mapper, a layer mapper, a transform precoder, precoding, a resource element mapper, multicarrier symbol generation, and modulation and upconversion. In FIG. 9, processing steps in dotted boxes F901 and F902 are optional, respectively.

In one embodiment, the phrase that an output of the first channel coding is used for generating the first radio signal refers to: the first radio signal is an output after an output of the first channel coding is sequentially subjected to rate matching, concatenation, scrambling, a modulation mapper, a layer mapper, precoding, a resource element mapper, multicarrier symbol generation, and modulation and upconversion.

In one embodiment, the phrase that an output of the first channel coding is used for generating the first radio signal refers to: the first radio signal is an output after an output of the first channel coding is sequentially subjected to rate matching, concatenation, scrambling, a modulation mapper, a layer mapper, a transform precoder, precoding, a resource element mapper, multicarrier symbol generation, and modulation and upconversion.

In one embodiment, the multicarrier symbol generation is Orthogonal Frequency Division Multiplexing (OFDM) symbol generation.

In one embodiment, the multicarrier symbol generation is Single Carrier-Frequency Division Multiple Access (SC-FDMA) symbol generation.

In one embodiment, the multicarrier symbol generation is Discrete Fourier Transform Spread OFDM (DFT-S-OFDM) symbol generation.

Embodiment 10

Figure 10:
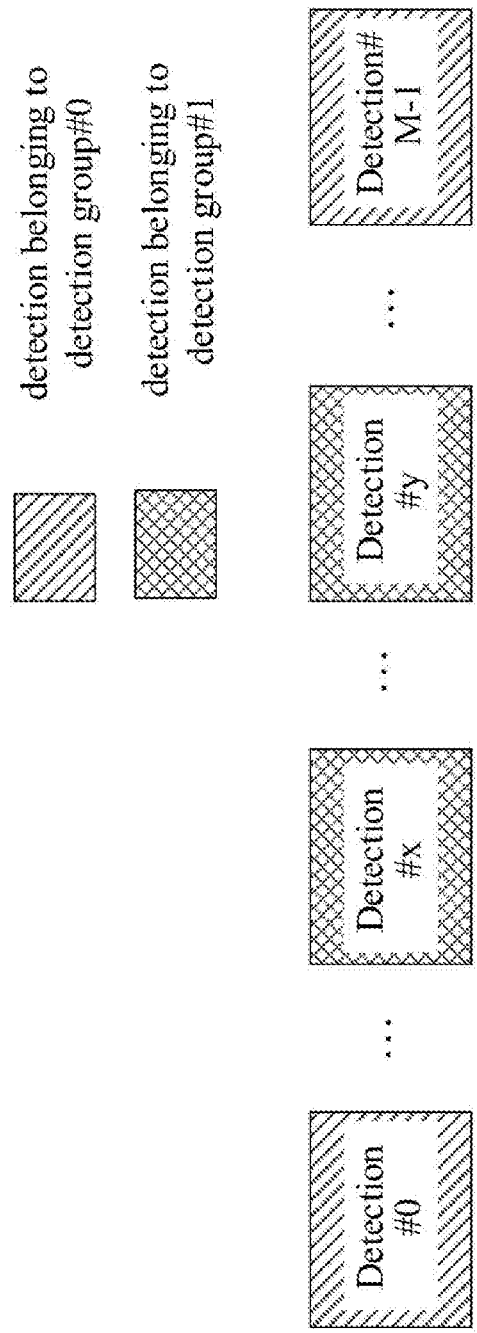
FIG. 10 illustrates a schematic diagram of a relationship between M detections and M1 detection groups according to one embodiment of the present disclosure.

Embodiment 10 illustrates a schematic diagram of a relationship between M detections and M1 detection groups; as shown in FIG. 10.

In Embodiment 10, at most M detections are performed on the first radio signal in the present disclosure, the M detections are divided into M1 detection groups, detections of the M1 detection groups employ M1 candidate bit blocks respectively, the second bit block in the present disclosure is a candidate bit block of the M1 candidate bit blocks. In FIG. 10, indices for the M detections are #0 . . . , #x . . . , #y . . . , and #M−1, respectively, wherein the x and the y are positive integers less than the M−1 respectively, the y is greater than the x. A box filled with slashes represents a detection of the M detections that belongs to a detection group #0 of the M1 detection groups. A box filled with crosses represents a detection of the M detections that belongs to a detection group #1 of the M1 detection groups.

In one embodiment, for any given detection of the M detections, the second node in the present disclosure performs channel decoding based on a first hypothesis; if a result of the channel decoding has passed CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups.

In one embodiment, the M detections are performed in M Resource Element (RE) sets respectively, each RE set of the M RE sets comprises multiple REs.

In one embodiment, any two detections of the M detections are performed in separate RE sets.

In one embodiment, the M detections are performed in M2 RE set(s) respectively, each RE set of the M2 RE set(s) comprises multiple REs, the M2 is a positive integer less than the M.

In one embodiment, at least two detections of the M detections are performed in a same RE set.

In one embodiment, any two detections of the M detections that are performed in a same RE set belong to separate detection groups of the M1 detection groups. In one embodiment, there are at least two detections of the M detections that are performed in a same RE set and belong to a same detection group of the M1 detection groups.

In one embodiment, a RE set is a PDCCH candidate.
In one embodiment, a RE set is an EPDCCH candidate.
In one embodiment, a RE set is an sPDCCH candidate.
In one embodiment, a RE set is an NR-PDCCH candidate.
In one embodiment, a RE set is an NB-PDCCH candidate.
In one embodiment, a RE set occupies a multicarrier symbol in time domain, and occupies a sub-carrier in frequency domain.

In one embodiment, the multicarrier symbol is an OFDM symbol.

In one embodiment, the multicarrier symbol is a SC-FDMA symbol.

In one embodiment, the multicarrier symbol is a DFT-S-OFDM symbol.

In one embodiment, the M detections are M times of blind decoding respectively.

in one embodiment, any two detections of the M detections correspond to different times of blind decoding.

In one embodiment, the M detections only correspond to N1 times of blind decoding, the N1 is a positive integer less than the M.

In one subembodiment of the above embodiment, the N1 is equal to 44.

In one embodiment, at least two detections of the M detections correspond to a same time of blind decoding.

In one embodiment, the number of times of blind decoding corresponding to the M detections is greater than the M1.

In one subembodiment of the above embodiment, the correlation parameter group only comprises a time-frequency resource occupied by the first radio signal.

In one subembodiment of the above embodiment, the correlation parameter group only comprises the number of bits comprised in the first information bit block.

In one subembodiment of the above embodiment, the correlation parameter group only comprises the first scrambling sequence.

In one embodiment, the number of times of blind decoding corresponding to the M detections is equal to the M1.

In one subembodiment of the above embodiment, the correlation parameter group only comprises a time-frequency resource occupied by the first radio signal and the number of bits comprised in the first information bit block.

In one embodiment, the number of times of blind decoding corresponding to the M detections is less than the M1.

In one subembodiment of the above embodiment, the correlation parameter group comprises a time-frequency resource occupied by the first radio signal, the number of bits comprised in the first information bit block and the first scrambling sequence.

In one embodiment, the blind decoding refers to: receiving a signal and performing decoding operation, if decoding is determined to be correct based on CRC bits, it is then determined that the first radio signal is received successfully; otherwise, it is determined that reception of the first radio signal has failed.

In one embodiment, any detection group of the M1 detection groups comprises a positive integer number of detection(s) of the M detections.

In one embodiment, any two detection groups of the M1 detection groups comprise an equal number of detections.

In one embodiment, at least two detection groups of the M1 detection groups comprise different numbers of detections.

In one embodiment, the M is equal to 44.
In one embodiment, the M is greater than 44.
In one embodiment, the M1 is equal to 2.
In one embodiment, the M1 is greater than 2.

Embodiment 11

Figure 11:
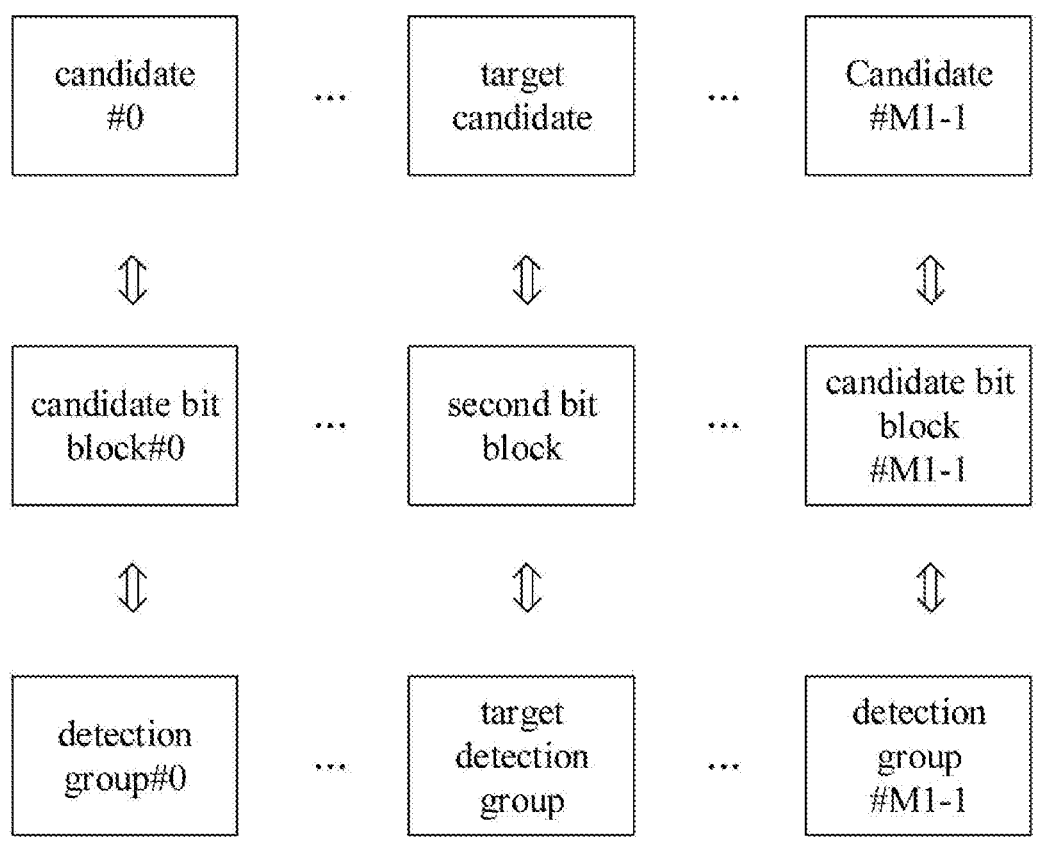
FIG. 11 illustrates a relationship between M1 candidates, M1 detection groups and M1 candidate bit blocks according to one embodiment of the present disclosure.

Embodiment 11 illustrates a relationship between M1 candidates, M1 detection groups and M1 candidate bit blocks; as shown in FIG. 11.

In Embodiment 11, the correlation parameter group in the present disclosure belongs to one of M1 candidates, at most M detections are performed on the first radio signal in the present disclosure, the M detections are divided into M1 detection groups, the M1 candidates correspond to the M1 detection groups respectively; detections of the M1 detection groups employ the M1 candidate bit blocks respectively, the second bit block is a candidate bit block of the M1 candidate bit blocks. In FIG. 11, indices for the M1 candidates, the M1 detection groups and the M1 candidate bit blocks are #0 . . . , and #M1−1, respectively.

In one embodiment, the second bit block is a candidate bit block of the M1 candidate bit blocks that corresponds to a target candidate, the target candidate is a candidate of the M1 candidates, the correlation parameter group belongs to the target candidate.

In one embodiment, any candidate of the M1 candidates comprises at least one of a positive integer number of candidate time-frequency resource(s), a positive integer number of candidate number(s), or a positive integer number of candidate scrambling sequence(s). The correlation parameter group is a subset of a candidate of the M1 candidates.

In one embodiment, the phrase that the correlation parameter group belongs to one of the M1 candidates refers to: the correlation parameter group is a subset of a candidate of the M1 candidates.

In one embodiment, the correlation parameter group comprises a time-frequency resource occupied by the first radio signal; the phrase that the correlation parameter group belongs to one of the M1 candidates refers to: a time-frequency resource occupied by the first radio signal is a candidate time-frequency resource comprised in a candidate of the M1 candidates, any candidate of the M1 candidates comprises a positive integer number of candidate time-frequency resource(s).

In one embodiment, any candidate time-frequency resource of the positive integer number of candidate time-frequency resource(s) is a CORESET.

In one embodiment, any candidate time-frequency resource of the positive integer number of candidate time-frequency resource(s) is a search space.

In one embodiment, any candidate time-frequency resource of the positive integer number of candidate time-frequency resource(s) is a PDCCH candidate.

In one embodiment, the correlation parameter group comprises the number of bits comprised in the first information bit block; the phrase that the correlation parameter group belongs to one of the M1 candidates refers to: the number of bits comprised in the first information bit block is a candidate number comprised in a candidate of the M1 candidates, any candidate of the M1 candidates comprises a positive integer number of candidate number(s).

In one embodiment, any candidate number of the positive integer number of candidate number(s) is a positive integer.

In one embodiment, the correlation parameter group comprises the first scrambling sequence; the phrase that the correlation parameter group belongs to one of the M1 candidates refers to: the first scrambling sequence is a candidate scrambling sequence comprised in a candidate of the M1 candidates, any candidate of the M1 candidates comprises a positive integer number of candidate scrambling sequence(s).

In one embodiment, the M1 candidates correspond to the M1 parameter group sets respectively, any parameter group set of the M1 parameter group sets comprises a positive integer number of parameter group(s); the phrase that the correlation parameter group belongs to one of the M1 candidates refers to: the correlation parameter group is a parameter group in a parameter group set of the M1 parameter group sets.

In one subembodiment of the above embodiment, any two parameter group sets of the M1 parameter group sets comprise an equal number of parameter groups.

In one subembodiment of the above embodiment, at least two parameter group sets of the M1 parameter group sets comprise different numbers of parameter groups.

In one subembodiment of the above embodiment, at least one parameter group set of the M1 parameter group sets comprises 1 parameter group.

In one subembodiment of the above embodiment, at least one parameter group set of the M1 parameter group sets comprises more than 1 parameter group.

In one embodiment, any candidate of the M1 candidates comprises at least one of a positive integer number of position(s) within the L1 indices in the present disclosure, a positive integer number of position(s) within the L2 candidate numbers, or positive integer number of position(s) within the L3 candidate scrambling sequences in the present disclosure.

In one embodiment, the correlation parameter group comprises a position of an index of a time-frequency resource occupied by the first radio signal in the L1 indices; the phrase that the correlation parameter group belongs to one of M1 candidates comprises: a position of an index of a time-frequency resource occupied by the first radio signal in the L1 indices is a position in the L1 indices comprised in a candidate of the M1 candidates, any candidate of the M1 candidates comprises a positive integer number of position(s) within the L1 indices.

In one embodiment, the correlation parameter group comprises a position of the number of bits comprised in the first information bit block in the L2 candidate numbers; the phrase that the correlation parameter group belongs to one of M1 candidates comprises: a position of the number of bits comprised in the first information bit block in the L2 candidate numbers is a position in the L2 candidate numbers comprised in a candidate of the M1 candidates, any candidate of the M1 candidates comprises a positive integer number of position(s) within the L2 candidate numbers.

In one embodiment, the correlation parameter group comprises a position of the first scrambling sequence in the L3 candidate scrambling sequences; the phrase that the correlation parameter group belongs to one of the M1 candidates comprises: a position of the first scrambling sequence in the L3 candidate scrambling sequences is a position in the L3 candidate scrambling sequences comprised in a candidate of the M1 candidates, any candidate of the M1 candidates comprises a positive integer number of position(s) within the L3 candidate scrambling sequences.

In one embodiment, all candidate bit blocks of the M1 candidate bit blocks comprise an equal number of bits.

In one embodiment, for any given candidate bit block of the M1 candidate bit blocks, values of all bits in the any given candidate bit block are equal.

In one embodiment, there exist two bits with unequal values in all bits comprised in at least one candidate bit block of the M1 candidate bit blocks.

In one embodiment, the M1 is equal to 2, the M1 candidate bit blocks are all-0 bit block and all-1 bit block respectively.

Embodiment 12

Embodiment 12 illustrates a schematic diagram of a correlation parameter group only comprising a time-frequency resource occupied by a first radio signal; as shown in FIG. 12.

In Embodiment 12, an output of the first channel coding in the present disclosure is used for generating the first radio signal; an output of the first channel coding is related to the second bit block in the present disclosure. Values of bits comprised in the second bit block are related to the correlation parameter group. The correlation parameter group belongs to one of M1 candidates, the second node in the present disclosure performs at most M detections on the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks. The correlation parameter group only comprises a time-frequency resource occupied by the first radio signal.

In one embodiment, the correlation parameter group only comprises a time-frequency resource occupied by the first radio signal.

In one embodiment, the correlation parameter group only comprises a time-frequency resource occupied by the first radio signal. For any given detection of the M detections, the second node receives a signal on a reference time-frequency resource and performs channel decoding based on a first hypothesis; if a result of the channel decoding has passed CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. A reference candidate comprises the reference time-frequency resource, the reference candidate is a candidate of the M1 candidates that corresponds to the reference detection group.

In one embodiment, the correlation parameter group only comprises a position of an index of a time-frequency resource occupied by the first radio signal in the L1 indices in the present disclosure.

In one subembodiment of the above embodiment, the M1 is equal to the L1.

In one subembodiment of the above embodiment, the M1 is less than the L1.

In one embodiment, the correlation parameter group only comprises a position of an index of a time-frequency resource occupied by the first radio signal in the L1 indices. For any given detection of the M detections, the second node receives a signal on a reference time-frequency resource and performs channel decoding based on a first hypothesis; if a result of the channel decoding has passed CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. A reference candidate comprises a position of an index of the reference time-frequency resource in the L1 indices, the reference candidate is a candidate of the M1 candidates that corresponds to the reference detection group.

Embodiment 13

Embodiment 13 illustrates a schematic diagram of a correlation parameter group only comprising the number of bits comprised in a first information bit block; as shown in FIG. 13. In Embodiment 13, the correlation parameter group only comprises the number of bits comprised in the first information bit block.

In one embodiment, the correlation parameter group only comprises the number of bits comprised in the first information bit block.

In one embodiment, the correlation parameter group only comprises the number of bits comprised in the first information bit block. For any given detection of the M detections, the second node performs channel decoding based on a first hypothesis and a second hypothesis, and performs CRC check; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number, a reference candidate comprises the reference candidate number, the reference candidate is a candidate of the M1 candidates that corresponds to the reference detection group.

In one embodiment, the correlation parameter group only comprises a position of the number of bits comprised in the first information bit block in the L2 candidate numbers.

In one subembodiment of the above embodiment, the M1 is equal to the L2.

In one subembodiment of the above embodiment, the M1 is less than the L2.

In one embodiment, the correlation parameter group only comprises a position of the number of bits comprised in the first information bit block in the L2 candidate numbers. For any given detection of the M detections, the second node performs channel decoding based on a first hypothesis and a second hypothesis, and performs CRC check; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number, a reference candidate comprises a position of the reference candidate number in the L2 candidate numbers, the reference candidate is a candidate of the M1 candidates that corresponds to the reference detection group.

Embodiment 14

Embodiment 14 illustrates a schematic diagram of a correlation parameter group only comprising a first scrambling sequence; as shown in FIG. 14. In Embodiment 14, the correlation parameter group only comprises the first scrambling sequence.

In one embodiment, the correlation parameter group only comprises the first scrambling sequence.

In one embodiment, the correlation parameter group only comprises the first scrambling sequence. For any given detection of the M detections, the second node performs channel decoding based on a first hypothesis and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The third hypothesis is: a reference scrambling sequence is used for generating the first check bit block, a reference candidate comprises the reference scrambling sequence, the reference candidate is a candidate of the M1 candidates that corresponds to the reference detection group.

In one embodiment, the correlation parameter group only comprises a position of the first scrambling sequence in the L3 candidate scrambling sequences.

In one subembodiment of the above embodiment, the M1 is equal to the L3.

In one subembodiment of the above embodiment, the M1 is less than the L3.

In one embodiment, the correlation parameter group only comprises a position of the first scrambling sequence in the L3 candidate scrambling sequences. For any given detection of the M detections, the second node performs channel decoding based on a first hypothesis and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The third hypothesis is: a reference scrambling sequence is used for generating the first check bit block, a reference candidate comprises a position of the reference scrambling sequence in the L3 candidate scrambling sequences, the reference candidate is a candidate of the M1 candidates that corresponds to the reference detection group.

In one embodiment, the L3 candidate scrambling sequences correspond to L3 Radio Network Temporary Identifiers (RNTIs) respectively.

In one embodiment, at least one candidate scrambling sequence of the L3 candidate scrambling sequences is related to a RNTI for a cell-common DCI.

In one embodiment, at least one candidate scrambling sequence of the L3 candidate scrambling sequences is related to a RNTI for a terminal group-common DCI, the terminal group comprises a positive integer number of terminal(s). The first node in the present disclosure is a terminal of the terminal group, the first node is a UE; or, the second node is a terminal of the terminal group, the second node is a UE.

In one embodiment, at least one candidate scrambling sequence of the L3 candidate scrambling sequences is related to a RNTI for a UE-specific DCI.

In one embodiment, at least one candidate scrambling sequence of the L3 candidate scrambling sequences is related to Cell-RNTI (C-RNTI).

In one embodiment, at least one candidate scrambling sequence of the L3 candidate scrambling sequences is related to Semi-Persistent Scheduling-C-RNTI (SPS-C-RNTI).

Embodiment 15

Embodiment 15 illustrates a schematic diagram of a correlation parameter group only comprising a time-frequency resource occupied by a first radio signal and the number of bits comprised in a first information bit block; as shown in FIG. 15. In Embodiment 15, the correlation parameter group only comprises a time-frequency resource occupied by a first radio signal and the number of bits comprised in the first information bit block.

In one embodiment, the correlation parameter group only comprises a time-frequency resource occupied by a first radio signal and the number of bits comprised in the first information bit block.

In one embodiment, the correlation parameter group only comprises a time-frequency resource occupied by a first radio signal and the number of bits comprised in the first information bit block. For any given detection of the M detections, the second node receives a signal in a reference time-frequency resource and performs channel decoding and CRC check based on a first hypothesis and a second hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number, a reference candidate comprises the reference time-frequency resource and the reference candidate number, the reference candidate is a candidate of the M1 candidates that corresponds to the reference detection group.

In one embodiment, the correlation parameter group only comprises a position of an index of a time-frequency resource occupied by the first radio signal in the L1 indices and a position of the number of bits comprised in the first information bit block in the L2 candidate numbers.

In one subembodiment of the above embodiment, the M1 is equal to a product of the L1 and the L2.

In one subembodiment of the above embodiment, the M1 is less than a product of the L1 and the L2.

In one embodiment, the correlation parameter group only comprises a position of an index of a time-frequency resource occupied by a first radio signal in the L1 indices and a position of the number of bits comprised in the first information bit block in the L2 candidate numbers. For any given detection of the M detections, the second node receives a signal in a reference time-frequency resource and performs channel decoding and CRC check based on a first hypothesis and a second hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number, a reference candidate comprises a position of the reference time-frequency resource in the L1 indices and a position of the reference candidate number in the L2 candidate numbers, the reference candidate is a candidate of the M1 candidates that corresponds to the reference detection group.

Embodiment 16

Embodiment 16 illustrates a schematic diagram of a correlation parameter group only comprising a time-frequency resource occupied by a first radio signal and a first scrambling sequence; as shown in FIG. 16. In Embodiment 16, the correlation parameter group only comprises a time-frequency resource occupied by the first radio signal and the first scrambling sequence.

In one embodiment, the correlation parameter group only comprises a time-frequency resource occupied by the first radio signal and the first scrambling sequence.

In one embodiment, the correlation parameter group only comprises a time-frequency resource occupied by the first radio signal and the first scrambling sequence. For any given detection of the M detections, the second node receives a signal in a reference time-frequency resource, performs channel decoding based on a first hypothesis and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The third hypothesis is: a reference scrambling sequence is used for generating the first check bit block, a reference candidate comprises the reference time-frequency resource and the reference scrambling sequence, the reference candidate is a candidate of the M1 candidates that corresponds to the reference detection group.

In one embodiment, the correlation parameter group only comprises a position of an index of a time-frequency resource occupied by the first radio signal in the L1 indices and a position of the first scrambling sequence in the L3 candidate scrambling sequence.

In one subembodiment of the above embodiment, the M1 is equal to a product of the L1 and the L3.

In one subembodiment of the above embodiment, the M1 is less than a product of the L1 and the L3.

In one embodiment, the correlation parameter group only comprises a position of an index of a time-frequency resource occupied by the first radio signal in the L1 indices and a position of the first scrambling sequence in the L3 candidate scrambling sequences. For any given detection of the M detections, the second node receives a signal in a reference time-frequency resource, performs channel decoding based on a first hypothesis and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The third hypothesis is: a reference scrambling sequence is used for generating the first check bit block, a reference candidate comprises a position of an index of the reference time-frequency resource in the L1 indices and a position of the reference scrambling sequence in the L3 candidate scrambling sequences, the reference candidate is a candidate of the M1 candidates that corresponds to the reference detection group.

Embodiment 17

Embodiment 17 illustrates a schematic diagram of a correlation parameter group only comprising the number of bits comprised in a first information bit block and a first scrambling sequence; as shown in FIG. 17. In FIG. 17, the correlation parameter group only comprises the number of bits comprised in the first information bit block and the first scrambling sequence.

In one embodiment, the correlation parameter group only comprises the number of bits comprised in the first information bit block and the first scrambling sequence.

In one embodiment, the correlation parameter group only comprises the number of bits comprised in the first information bit block and the first scrambling sequence. For any given detection of the M detections, the second node performs channel decoding based on a first hypothesis and a second hypothesis, and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number. The third hypothesis is: a reference scrambling sequence is used for generating the first check bit block. A reference candidate comprises the reference candidate number and the reference scrambling sequence, the reference candidate is a candidate of the M1 candidates that corresponds to the reference detection group.

In one embodiment, the correlation parameter group only comprises a position of the number of bits comprised in the first information bit block in the L2 candidate numbers and a position of the first scrambling sequence in the L3 candidate scrambling sequences.

In one subembodiment of the above embodiment, the M1 is equal to a product of the L2 and the L3.

In one subembodiment of the above embodiment, the M1 is less than a product of the L2 and the L3.

In one embodiment, the correlation parameter group only comprises a position of the number of bits comprised in the first information bit block in the L2 candidate numbers and a position of the first scrambling sequence in the L3 candidate scrambling sequences. For any given detection of the M detections, the second node performs channel decoding based on a first hypothesis and a second hypothesis, and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number. The third hypothesis is: a reference scrambling sequence is used for generating the first check bit block. A reference candidate comprises a position of the reference candidate number in the L2 candidate numbers and a position of the reference scrambling sequence in the L3 candidate scrambling sequences, the reference candidate is a candidate of the M1 candidates that corresponds to the reference detection group.

Embodiment 18

Figures 18, 19:
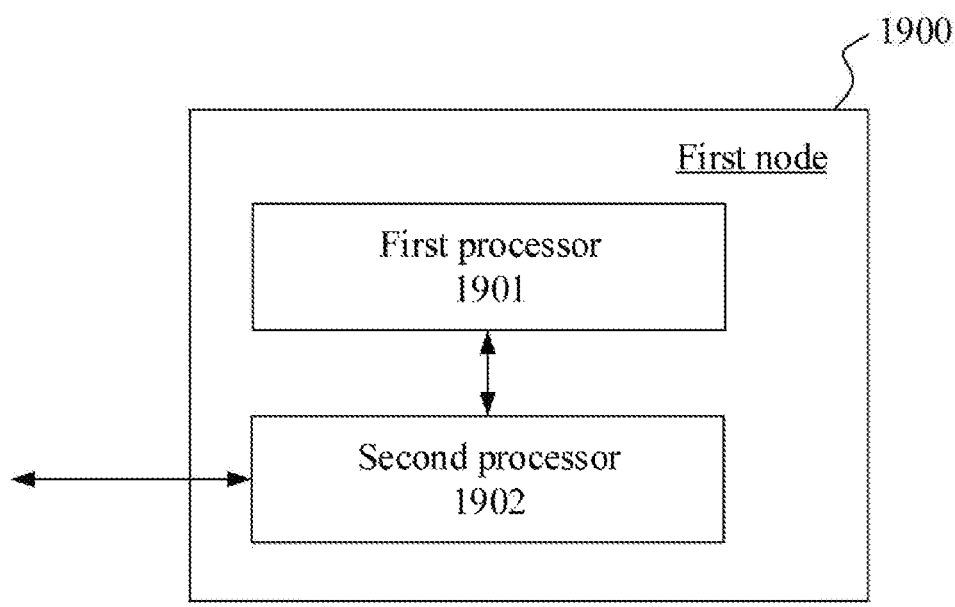
FIG. 18 illustrates a schematic diagram of a correlation parameter group only comprising a time-frequency resource occupied by a first radio signal, the number of bits comprised in a first information bit block and a first scrambling sequence according to one embodiment of the present disclosure.
FIG. 19 illustrates a structure block diagram of a processing device in a first node according to one embodiment of the present disclosure.

Embodiment 18 illustrates a schematic diagram of a correlation parameter group only comprising a time-frequency resource occupied by a first radio signal, the number of bits comprised in a first information bit block and a first scrambling sequence; as shown in FIG. 18. In Embodiment 18, the correlation parameter group comprises a time-frequency resource occupied by the first radio signal, the number of bits comprised in the first information bit block and the first scrambling sequence.

In one embodiment, the correlation parameter group comprises a time-frequency resource occupied by the first radio signal, the number of bits comprised in the first information bit block and the first scrambling sequence.

In one embodiment, the correlation parameter group comprises a time-frequency resource occupied by the first radio signal, the number of bits comprised in the first information bit block and the first scrambling sequence. For any given detection of the M detections, the second node receives a signal in a reference time-frequency resource, performs channel decoding based on a first hypothesis and a second hypothesis, and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number. The third hypothesis is: a reference scrambling sequence is used for generating the first check bit block. A reference candidate comprises the reference time-frequency resource, the reference candidate number and the reference scrambling sequence, the reference candidate is a candidate of the M1 candidates that corresponds to the reference detection group.

In one embodiment, the correlation parameter group comprises a position of an index of a time-frequency resource occupied by the first radio signal in the L1 indices, a position of the number of bits comprised in the first information bit block in the L2 candidate numbers, and a position of the first scrambling sequence in the L3 candidate scrambling sequences.

In one subembodiment of the above embodiment, the M1 is equal to a product of the L1, the L2 and the L3.

In one subembodiment of the above embodiment, the M1 is less than a product of the L1, the L2 and the L3.

In one embodiment, the correlation parameter group only comprises a position of an index of a time-frequency resource occupied by the first radio signal in the L1 indices, a position of the number of bits comprised in the first information bit block in the L2 candidate numbers and a position of the first scrambling sequence in the L3 candidate scrambling sequences. For any given detection of the M detections, the second node receives a signal in a reference time-frequency resource, performs channel decoding based on a first hypothesis and a second hypothesis, and performs CRC check based on a third hypothesis; if a result of the channel decoding has passed the CRC check, it is then determined that the first radio signal is received successfully, otherwise, it is determined that reception of the first radio signal has failed. The first hypothesis is: the second bit block is a reference bit block, the reference bit block is a candidate bit block of the M1 candidate bit blocks that corresponds to a reference detection group, the any given detection belongs to the reference detection group of the M1 detection groups. The second hypothesis is: the number of bits comprised in the first information bit block is equal to a reference candidate number. The third hypothesis is: a reference scrambling sequence is used for generating the first check bit block. A reference candidate comprises a position of an index of the reference time-frequency resource in the L1 indices, a position of the reference candidate number in the L2 candidate numbers and a position of the reference scrambling sequence in the L3 candidate scrambling sequences, the reference candidate is a candidate of the M1 candidates that corresponds to the reference detection group.

Embodiment 19

Embodiment 19 illustrates a structure block diagram of a processing device in a first node; as shown in FIG. 19. In FIG. 19, a processing device 1900 in a first node mainly consists of a first processor 1901 and a second processor 1902.

In Embodiment 19, a first processor 1901 performs a first channel coding; and a second processor 1902 transmits a first radio signal.

In Embodiment 19, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the first processor 1901 also determines the second bit block based on the correlation parameter group; wherein the correlation parameter group belongs to one of M1 candidates, at most M detections are performed on the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

In one embodiment, the second processor 1902 further receives first downlink information; wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the first node is a UE.

In one embodiment, the second processor 1902 further transmits first downlink information; wherein the first downlink information is used for determining L1 indices; the correlation parameter group comprises a position of an index of a time-frequency resource occupied by the first radio signal in the L1 indices, the L1 indices correspond to L1 candidate time-frequency resources respectively, the L1 is a positive integer greater than 1; the first node is a base station.

In one embodiment, the second processor 1902 further receives second downlink information; wherein the second downlink information is used for determining L2 candidate numbers; the correlation parameter group comprises a position of the number of bits comprised in the first information bit block in the L2 candidate numbers, the L2 is a positive integer greater than 1; the first node is a UE.

In one embodiment, the second processor 1902 further transmits second downlink information; wherein the second downlink information is used for determining L2 candidate numbers; the correlation parameter group comprises a position of the number of bits comprised in the first information bit block in the L2 candidate numbers, the L2 is a positive integer greater than 1; the first node is a base station. In one embodiment, the second processor 1902 further receives third downlink information; wherein the third downlink information is used for determining L3 candidate scrambling sequences; the correlation parameter group comprises a position of the first scrambling sequence in the L3 candidate scrambling sequences, the L3 is a positive integer greater than 1; the first node is a UE.

In one embodiment, the second processor 1902 further transmits third downlink information; wherein the third downlink information is used for determining L3 candidate scrambling sequences; the correlation parameter group comprises a position of the first scrambling sequence in the L3 candidate scrambling sequences, the L3 is a positive integer greater than 1; the first node is a base station.

In one embodiment, the second processor 1902 further receives first information; wherein the first information is used for determining the M1 candidate bit blocks; the first node is a UE.

In one embodiment, the second processor 1902 further transmits first information; wherein the first information is used for determining the M1 candidate bit blocks; the first node is a base station.

In one embodiment, the first node is a UE.

In one embodiment, the first node is a base station.

In one embodiment, the first processor 1901 comprises at least one of the transmitting processor 468 and the channel encoder 457 in Embodiment 4, the first node is a UE.

In one embodiment, the first processor 1901 comprises at least one of the transmitting processor 416 and the channel encoder 477 in Embodiment 4, the first node is a base station.

In one embodiment, the second processor 1902 comprises at least one of the antenna 452, the transmitter/receiver 454, the transmitting processor 468, the receiving processor 456, the channel encoder 457, the channel decoder 458, the controller/processor 459, the memory 460, or the data source 467 in Embodiment 4, the first node is a UE.

In one embodiment, the second processor 1902 comprises at least one of the antenna 420, the transmitter 418, the transmitting processor 416, the channel encoder 477, the controller/processor 475, or the memory 476 in Embodiment 4, the first node is a base station.

Embodiment 20

Figure 20:
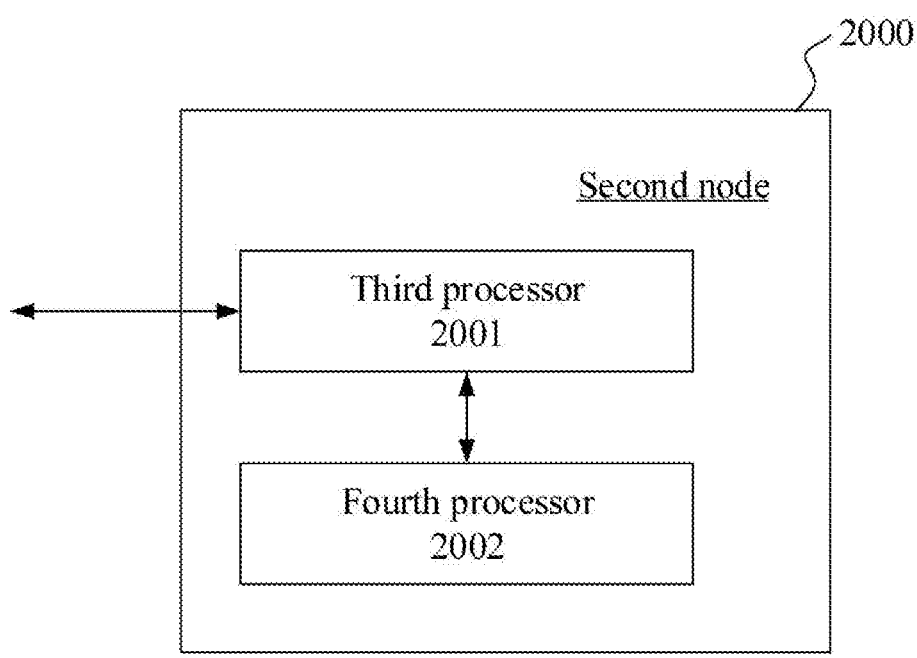
FIG. 20 illustrates a structure block diagram of a processing device in a second node according to one embodiment of the present disclosure.

Embodiment 20 illustrates a structure block diagram of a processing device in a second node; as shown in FIG. 20. In FIG. 20, a processing device 2000 in a second node mainly consists of a third processor 2001 and a fourth processor 2002.

In Embodiment 20, a third processor 2001 receives a first radio signal; a fourth processor 2002 performs a first channel decoding.

In Embodiment 20, a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; an output of the first channel coding is related to a second bit block, values of bits comprised in the second bit block are related to a correlation parameter group, the correlation parameter group comprises at least one of a time-frequency resource occupied by the first radio signal, the number of bits comprised in the first information bit block, or a first scrambling sequence. The first scrambling sequence is used for generating the first check bit block.

In one embodiment, the third processor 2001 and the fourth processor 2002 also perform at most M detections on the first radio signal; wherein the correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

In one embodiment, the third processor 2001 further receives first downlink information; wherein the first downlink information is used for determining L1 indices; the correlation parameter group comprises a position of an index of a time-frequency resource occupied the first radio signal in the L1 indices, the L1 indices correspond to L1 candidate time-frequency resources respectively, the L1 is a positive integer greater than 1; the second node is a UE.

In one embodiment, the third processor 2001 further transmits first downlink information; wherein the first downlink information is used for determining L1 indices; the correlation parameter group comprises a position of an index of a time-frequency resource occupied the first radio signal in the L1 indices, the L1 indices correspond to L1 candidate time-frequency resources respectively, the L1 is a positive integer greater than 1; the second node is a base station.

In one embodiment, the third processor 2001 further receives second downlink information; wherein the second downlink information is used for determining L2 candidate numbers; the correlation parameter group comprises a position of the number of bits comprised in the first information bit block in the L2 candidate numbers, the L2 is a positive integer greater than 1; the second node is a UE.

In one embodiment, the third processor 2001 further transmits second downlink information; wherein the second downlink information is used for determining L2 candidate numbers; the correlation parameter group comprises a position of the number of bits comprised in the first information bit block in the L2 candidate numbers, the L2 is a positive integer greater than 1; the second node is a base station.

In one embodiment, the third processor 2001 further receives third downlink information; wherein the third downlink information is used for determining L3 candidate scrambling sequences, the correlation parameter group comprises a position of the first scrambling sequence in the L3 candidate scrambling sequences, the L3 is a positive integer greater than 1; the second node is a UE.

In one embodiment, the third processor 2001 further transmits third downlink information; wherein the third downlink information is used for determining L3 candidate scrambling sequences, the correlation parameter group comprises a position of the first scrambling sequence in the L3 candidate scrambling sequences, the L3 is a positive integer greater than 1; the second node is a base station.

In one embodiment, the third processor 2001 further receives first information; wherein the first information is used for determining the M1 candidate bit blocks; the second node is a UE.

In one embodiment, the third processor 2001 further transmits first information; wherein the first information is used for determining the M1 candidate bit blocks; the second node is a base station.

In one embodiment, the second node is a base station.

In one embodiment, the second node is a UE.

In one embodiment, the third processor 2001 comprises at least one of the antenna 452, the receiver 454, the receiving processor 456, the channel decoder 458, the controller/processor 459, the memory 460, or the data source 467 in Embodiment 4, the second node is a UE.

In one embodiment, the third processor 2001 comprises at least one of the antenna 420, the transmitter/processor 418, the transmitting processor 416, the receiving processor 470, the channel encoder 477, the channel decoder 478, the controller/processor 475, or the memory 476 in Embodiment 4, the second node is a base station.

In one embodiment, the fourth processor 2002 comprises at least one of the receiving processor 456 and the channel decoder 458 in Embodiment 4, the second node is a UE.

In one embodiment, the fourth processor 2002 comprises at least one of the receiving processor 470 and the channel decoder 478 in Embodiment 4, the second node is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node used for wireless communication, comprising:
   determining a second bit block based on a correlation parameter group;
   performing a first channel coding; and
   transmitting a first radio signal;
   wherein the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; the output of the first channel coding is related to the second bit block, values of bits comprised in the second bit block are related to the correlation parameter group, the correlation parameter group comprises at least one of the following:
   a time-frequency resource occupied by the first radio signal;
   a number of bits comprised in the first information bit block; and
   a first scrambling sequence, the first scrambling sequence is used for generating the first check bit block;
   the correlation parameter group belongs to one of M1 candidates, at most M detections are performed for the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

2. The method according to claim 1, comprising:
   operating first downlink information, wherein the first downlink information is used for determining L1 indices, the correlation parameter group comprises a position of an index of the time-frequency resource occupied by the first radio signal in the L1 indices, the L1 indices correspond to L1 candidate time-frequency resources respectively, the L1 is a positive integer greater than 1, the operating is receiving or transmitting;
   or, comprising:
   operating second downlink information, wherein the second downlink information is used for determining L2 candidate numbers, the correlation parameter groups comprises a position of the number of bits comprised in the first information bit block in the L2 candidate numbers, the L2 is a positive integer greater than 1, the operating is receiving or transmitting;
   or, comprising:
   operating third downlink information, wherein the third downlink information is used for determining L3 candidate scrambling sequences, the correlation parameter group comprises a position of the first scrambling sequence in the L3 candidate scrambling sequences, the L3 is a positive integer greater than 1, the operating is receiving or transmitting.

3. The method according to claim 1, comprising:
   operating first information;
   wherein the first information is used for determining the M1 candidate bit blocks; the operating is receiving or transmitting.

4. The method according to claim 1, wherein the first node is a User Equipment (UE); or, the first node is a base station.

5. A method in a second node used for wireless communication, comprising:
   performing at most M detections for a first radio signal and receiving the first radio signal; and
   performing a first channel decoding;
   wherein a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; the output of the first channel coding is related to a second bit block, values of bits comprised in the second bit block are related to a correlation parameter group, the correlation parameter group comprises at least one of the following:
   a time-frequency resource occupied by the first radio signal;
   a number of bits comprised in the first information bit block; and
   a first scrambling sequence, the first scrambling sequence is used for generating the first check bit block;

the correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

6. The method according to claim 4, comprising:

processing first downlink information, wherein the first downlink information is used for determining L1 indices, the correlation parameter group comprises a position of an index of the time-frequency resource occupied by the first radio signal in the L1 indices, the L1 indices correspond to L1 candidate time-frequency resources respectively, the L1 is a positive integer greater than 1, the processing is transmitting or receiving;

or, comprising:

processing second downlink information, wherein the second downlink information is used for determining L2 candidate numbers, the correlation parameter groups comprises a position of the number of bits comprised in the first information bit block in the L2 candidate numbers, the L2 is a positive integer greater than 1, the processing is transmitting or receiving;

or, comprising:

processing third downlink information, wherein the third downlink information is used for determining L3 candidate scrambling sequences, the correlation parameter group comprises a position of the first scrambling sequence in the L3 candidate scrambling sequences, the L3 is a positive integer greater than 1, the processing is transmitting or receiving.

7. The method according to claim 5, comprising:

processing first information;

wherein the first information is used for determining the M1 candidate bit blocks; the processing is transmitting or receiving.

8. The method according to claim 5, wherein the second node is a base station; or, the second node is a UE.

9. A device in a first node used for wireless communication, comprising:

a first processor, determining a second bit block based on a correlation parameter group and performing a first channel coding; and a second processor, transmitting a first radio signal;

wherein the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; the output of the first channel coding is related to the second bit block, values of bits comprised in the second bit block are related to the correlation parameter group, the correlation parameter group comprises at least one of the following:

a time-frequency resource occupied by the first radio signal;

a number of bits comprised in the first information bit block; and a first scrambling sequence, the first scrambling sequence is used for generating the first check bit block;

the correlation parameter group belongs to one of M1 candidates, at most M detections are performed for the first radio signal, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

10. The device in a first node according to claim 9, wherein the second processor operates first downlink information, wherein the first downlink information is used for determining L1 indices, the correlation parameter group comprises a position of an index of the time-frequency resource occupied by the first radio signal in the L1 indices, the L1 indices correspond to L1 candidate time-frequency resources respectively, the L1 is a positive integer greater than 1, the operating action is receiving or transmitting;

or, the second processor operates second downlink information, wherein the second downlink information is used for determining L2 candidate numbers, the correlation parameter groups comprises a position of the number of bits comprised in the first information bit block in the L2 candidate numbers, the L2 is a positive integer greater than 1, the operating action is receiving or transmitting;

or, the second processor operates third downlink information, wherein the third downlink information is used for determining L3 candidate scrambling sequences, the correlation parameter group comprises a position of the first scrambling sequence in the L3 candidate scrambling sequences, the L3 is a positive integer greater than 1, the operating action is receiving or transmitting.

11. The device in a first node according to claim 9, wherein the second processor operates first information; wherein the first information is used for determining the M1 candidates bit blocks; the operating action is receiving or transmitting.

12. The device in a first node according to claim 9, wherein the first node is a UE; or, the first node is a base station.

13. A device in a second node used for wireless communication, comprising:

a third processor and a fourth processor, performing at most M detections for a first radio signal;

the third processor receiving the first radio signal; and the fourth processor performing a first channel decoding;

wherein a channel coding corresponding to the first channel decoding is a first channel coding, the first channel coding is based on a polar code; an input of the first channel coding comprises all bits of a first information bit block and all bits of a first check bit block, an information bit block corresponding to the first check bit block comprises the first information bit block; an output of the first channel coding is used for generating the first radio signal; the output of the first channel coding is related to a second bit block, values of bits comprised in the second bit block are related to a correlation parameter group, the correlation parameter group comprises at least one of the following:

a time-frequency resource occupied by the first radio signal;

a number of bits comprised in the first information bit block; and a first scrambling sequence, the first scrambling sequence is used for generating the first check bit block;

the correlation parameter group belongs to one of M1 candidates, the M detections are divided into M1 detection groups, the M1 candidates correspond to the M1 detection groups respectively; detections of the M1 detection groups employ M1 candidate bit blocks respectively, the second bit block is a candidate bit block of the M1 candidate bit blocks; the M1 is a positive integer greater than 1, the M is a positive integer not less than the M1.

14. The device in a second node according to claim 13, wherein the third processor processes first downlink information, wherein the first downlink information is used for determining L1 indices, the correlation parameter group comprises a position of an index of the time-frequency resource occupied by the first radio signal in the L1 indices, the L1 indices correspond to L1 candidate time-frequency resources respectively, the L1 is a positive integer greater than 1, the processing action is transmitting or receiving;

or, the third processor processes second downlink information, wherein the second downlink information is used for determining L2 candidate numbers, the correlation parameter groups comprises a position of the number of bits comprised in the first information bit block in the L2 candidate numbers, the L2 is a positive integer greater than 1, the processing action is transmitting or receiving;

or, the third processor processes third downlink information, wherein the third downlink information is used for determining L3 candidate scrambling sequences, the correlation parameter group comprises a position of the first scrambling sequence in the L3 candidate scrambling sequences, the L3 is a positive integer greater than 1, the processing action is transmitting or receiving.

15. The device in a second node according to claim 13, wherein the third processor processes first information; wherein the first information is used for determining the M1 candidate bit blocks; the processing action is transmitting or receiving.

16. The device in a second node according to claim 13, wherein the second node is a base station; or, the second node is a UE.

* * * * *